(12) United States Patent
Kondo et al.

(10) Patent No.: US 7,927,514 B2
(45) Date of Patent: Apr. 19, 2011

(54) MICROCAPSULE-BASED HARDENER FOR EPOXY RESIN, MASTERBATCH-BASED HARDENER COMPOSITION FOR EPOXY RESIN, ONE-PART EPOXY RESIN COMPOSITION, AND PROCESSED GOOD

(75) Inventors: Yoshikimi Kondo, Tokyo (JP); Hiroshi Uchida, Tokyo (JP); Kazuhiro Daikai, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 171 days.

(21) Appl. No.: 12/223,523

(22) PCT Filed: Jan. 31, 2007

(86) PCT No.: PCT/JP2007/051595
§ 371 (c)(1),
(2), (4) Date: Dec. 1, 2008

(87) PCT Pub. No.: WO2007/088889
PCT Pub. Date: Aug. 9, 2007

(65) Prior Publication Data
US 2009/0186962 A1 Jul. 23, 2009

(30) Foreign Application Priority Data

Feb. 3, 2006 (JP) .................................. 2006-027073
Jun. 20, 2006 (JP) .................................. 2006-169786

(51) Int. Cl.
*H01B 1/12* (2006.01)
*C08F 283/00* (2006.01)
*C08K 5/55* (2006.01)

(52) U.S. Cl. ... 252/500; 525/523; 524/183; 428/402.24; 523/211; 106/287.3; 429/129

(58) Field of Classification Search .................. 252/500; 525/523; 524/183; 428/42.24, 402.24; 523/211; 106/287.3; 429/129
See application file for complete search history.

(56) References Cited

U.S. PATENT DOCUMENTS

| | | | | |
|---|---|---|---|---|
| 4,833,226 A * | 5/1989 | Ishimura et al. | ............ | 528/45 |
| 5,357,008 A * | 10/1994 | Tsai et al. | ............ | 525/526 |
| 5,548,058 A * | 8/1996 | Muroi et al. | ............ | 528/93 |
| 5,589,523 A * | 12/1996 | Sawaoka et al. | ............ | 523/211 |
| 6,555,602 B1 * | 4/2003 | Harada et al. | ............ | 523/466 |
| 6,805,958 B2 * | 10/2004 | Nakamura et al. | ............ | 428/416 |
| 7,820,772 B2 * | 10/2010 | Usui et al. | ............ | 525/526 |
| 2006/0128835 A1 * | 6/2006 | Usui et al. | ............ | 523/211 |
| 2008/0251757 A1 * | 10/2008 | Yamamoto et al. | ............ | 252/73 |
| 2009/0261298 A1 * | 10/2009 | Kondo et al. | ............ | 252/500 |

FOREIGN PATENT DOCUMENTS

| | | |
|---|---|---|
| JP | 62-141083 | 6/1987 |
| JP | 1-70523 | 3/1989 |
| JP | 64-70523 | 3/1989 |
| JP | 1-113480 | 5/1989 |
| JP | 4-6116 | 1/1992 |
| JP | 5-43661 | 2/1993 |
| JP | 5-295329 | 11/1993 |
| JP | 6-136244 | 5/1994 |
| JP | 7-304931 | 11/1995 |
| JP | 8-64960 | 3/1996 |
| JP | 9-71633 | 3/1997 |
| JP | 10-168163 | 6/1998 |
| JP | 10-237410 | 9/1998 |
| JP | 11-323247 | 11/1999 |
| JP | 2000-3987 | 1/2000 |
| JP | 2001-55483 | 2/2001 |
| JP | 2002-226675 | 8/2002 |
| JP | 2002-332328 | 11/2002 |
| JP | 2003-246838 | 9/2003 |
| JP | 2004-75954 | 3/2004 |
| JP | 2005-113103 | 4/2005 |
| JP | 2005-344046 | 12/2005 |
| JP | 2006-137838 | 6/2006 |
| TW | 200410998 | 7/2004 |
| TW | 200716686 | 5/2007 |
| WO | 98/44017 | 10/1998 |
| WO | 00/64960 | 11/2000 |
| WO | WO 2004037885 A1 * | 5/2004 |
| WO | 2005/035617 | 4/2005 |
| WO | 2005/095486 | 10/2005 |
| WO | 2006/090794 | 8/2006 |

OTHER PUBLICATIONS

International Preliminary Report on Patentability issued Aug. 12, 2008 in corresponding International Patent Application No. PCT/JP2007/051595.

* cited by examiner

*Primary Examiner* — Douglas Mc Ginty
(74) *Attorney, Agent, or Firm* — Staas & Halsey LLP

(57) ABSTRACT

Provided is a microcapsule-based hardener for an epoxy resin, which have a core (C) formed using a hardener (H) for the epoxy resin as a starting material and a shell (S) for covering the core (C) therewith. Since it is characterized in that the hardener (H) for the epoxy resin has an average particle size exceeding 0.3 μm and not greater than 12 μm; a content of a small-particle-size hardener for epoxy resin defined to have a particle size 0.5 time or less of the average particle size of the hardener (H) for the epoxy resin is from 0.1 to 15%; and the shell (S) has, on the surface thereof, a binding group (x) capable of absorbing infrared rays having a wave number of from 1630 to 1680 cm$^{-1}$, a binding group (y) capable of absorbing infrared rays having a wave number of from 1680 to 1725 cm$^{-1}$, and a binding group (z) capable of absorbing infrared rays having a wave number of from 1730 to 1755 cm$^{-1}$, it is excellent in storage stability and at the same time, in reaction rapidity.

45 Claims, No Drawings

MICROCAPSULE-BASED HARDENER FOR EPOXY RESIN, MASTERBATCH-BASED HARDENER COMPOSITION FOR EPOXY RESIN, ONE-PART EPOXY RESIN COMPOSITION, AND PROCESSED GOOD

CROSS REFERENCE TO RELATED PATENT APPLICATIONS

This application claims the benefit under 35 U.S.C. Section 371, of PCT International Application No. PCT/JP2007/051595, filed Jan. 31, 2007, which claimed priority to Japanese Application No. 2006-027073 filed Feb. 3, 2006, and Japanese Application No. 2006-169786 filed Jun. 20, 2006, in the Japanese Patent Office, the disclosures of which are hereby incorporated by reference.

TECHNICAL FIELD

The present invention relates to a novel hardener for epoxy resin, a one-part epoxy resin composition using the hardener, and the like.

BACKGROUND ART

Epoxy resins have been used for various purposes such as paints, electric or electronic insulating materials and adhesives because hardened products of them are excellent in mechanical properties, electrical properties, thermal properties, chemical resistance, adhesion properties, and the like.

As an epoxy resin composition used for such purposes, so-called two-component epoxy resin compositions (which may also be called "two-part epoxy resin compositions") comprising an epoxy resin and a hardener and cured by mixing these two components upon use are typical. Two-part epoxy resin compositions can be cured well at room temperature, but need separate storage of the epoxy resin and the hardener. In addition, upon use, they must be weighed and then mixed with each other. In addition, a mixture of the epoxy resin and the hardener is usable for only a limited time after mixing so that it is impossible to prepare a large amount of the mixture in advance. In short, there is room for improvement in the conventional two-part epoxy resin composition from the viewpoint of easy storage, easy handling, and mixing frequency (production efficiency).

Some one-component epoxy resin compositions (which may be referred to as "one-part epoxy resin compositions) have been proposed. Examples of such one-part epoxy resin compositions may include those obtained by incorporating, in an epoxy resin, a latent hardener such as dicyandiamide, $BF_3$-amine complex, an amine salt, or a modified imidazole compound.

However, these one-part epoxy resin compositions are, when excellent in storage stability, inferior in hardening property (treatment at high temperatures or treatment for long hours is necessary for hardening). On the other hand, they are, when excellent in hardening property, inferior in storage stability (storage at a temperature as low as $-20°$ C. is demanded). For example, a one-part epoxy resin composition containing dicyandiamide can be stored stably for 6 months or greater when stored at normal temperature. Such a one-part epoxy resin composition, however, sometimes needs a hardening temperature as high as 170° C. or greater. Addition of a curing accelerator to such a one-part epoxy resin composition can decrease the hardening temperature to approximately 130° C. It is apt to deteriorate the storage stability at room temperature so that storage at low temperature is required. In short, there is an eager demand for the development of a one-part epoxy resin composition capable of satisfying high hardening property and excellent storage stability.

In order to satisfy such a demand, a so-called microcapsule-based hardener obtained by covering a core containing an amine hardener with a specific shell has been proposed (refer to, for example, Patent Document 1 and Patent Document 2). The microcapsule-based hardeners disclosed therein can satisfy both good hardening property and storage stability.

[Patent Document 1] Japanese Patent Laid-Open No. Hei 1-70523
[Patent Document 2] Japanese Patent Laid-Open No. 2005-344046

DISCLOSURE OF THE INVENTION

Problems to be Solved by the Invention

In recent years, particularly in the field of electronic appliances, one-part epoxy resin compositions have been required to satisfy both storage stability and superior reaction rapidity at a higher level. It is therefore desired to improve the reaction rapidity of a one-part epoxy resin composition, to be used as one of connection materials, further without damaging its storage stability in order to realize high integration density of circuits, improvement in connection reliability, weight reduction of mobile apparatuses, great improvement in productivity, and the like.

An object of the present invention is to provide a microcapsule-based hardener for epoxy resin excellent in storage stability and at the same time, excellent in reaction rapidity.

Means for Solving the Problems

The present inventors have carried out an extensive investigation with a view to overcoming the above-described problem. As a result, it has been found that when a microcapsule-based hardener for epoxy resin having a core (C) formed using a hardener (H) for epoxy resin as a starting material and a shell (S) for covering the core therewith is prepared, the above-described problem can be overcome by defining an average particle size of the hardener (H) for epoxy resin and a content of a small-particle-size hardener for epoxy resin to fall within specific ranges and using these requirements in combination with another requirement, leading to the completion of the present invention.

In the present invention, there are thus provided a microcapsule-based hardener for epoxy resin, a masterbatch-based hardener composition for epoxy resin, a one-part epoxy resin composition, and a processed good obtained using the one-part epoxy resin composition.

[1]. A microcapsule-based hardener for an epoxy resin comprising: a core (C) formed using a hardener (H) for the epoxy resin as a starting material and; a shell (S) covering the core (C) therewith, wherein:

the hardener (H) for the epoxy resin has an amine adduct (A) as a main component and the amine adduct (A) is available by a reaction between an epoxy resin (e1) and an amine compound;

the hardener (H) for the epoxy resin has an average particle size exceeding 0.3 μm and not greater than 12 μm and has a content of a small-particle-size hardener for the epoxy resin, which is defined to have an average particle size 0.5 time or less of the average particle size of the hardener (H) for the epoxy resin, from 0.1 to 15%; and the shell (S) has, at least on the surface thereof, a binding group (x) capable of absorbing

[1] an infrared ray having a wave number of from 1630 to 1680 cm$^{-1}$, a binding group (y) capable of absorbing an infrared ray having a wave number of from 1680 to 1725 cm$^{-1}$, and a binding group (z) capable of absorbing an infrared ray having a wave number of from 1730 to 1755 cm$^{-1}$.

[2] A microcapsule-based hardener for an epoxy resin comprising: a core (C) formed using a hardener (H) for the epoxy resin as a starting material and; a shell (S) covering the core (C) therewith, wherein:

the hardener (H) for the epoxy resin has an amine adduct (A) as a main component and the amine adduct (A) is available by a reaction between an epoxy resin (e1) and an amine compound;

the hardener (H) for the epoxy resin has an average particle size exceeding 0.3 μm and not greater than 12 μm and the hardener (H) for the epoxy resin has a specific surface area of from 1 to 25 m$^2$/g; and the shell (S) has, at least on the surface thereof, a binding group (x) capable of absorbing an infrared ray having a wave number of from 1630 to 1680 cm$^{-1}$, a binding group (y) capable of absorbing an infrared ray having a wave number of from 1680 to 1725 cm$^{-1}$, and a binding group (z) capable of absorbing an infrared ray having a wave number of from 1730 to 1755 cm$^{-1}$.

[3] The microcapsule-based hardener for the epoxy resin according to item [1] or [2], wherein the shell (S) has, in a structure thereof, a urea bond but has no ester bond.

[4] A microcapsule-based hardener for an epoxy resin comprising: a core (C) formed using a hardener (H) for the epoxy resin as a starting material and; a shell (S) covering the core (C) therewith, wherein:

the hardener (H) for the epoxy resin has an amine adduct (A) as a main component and the amine adduct (A) is available by a reaction between an epoxy resin (e1) and an amine compound;

the hardener (H) for the epoxy resin has an average particle size exceeding 0.3 μm and not greater than 10 μm; and the shell (S) has, in a structure thereof, a urea bond but has no an ester bond, and a ratio of a thickness of the shell (S) to the average particle size of the hardener (H) for the epoxy resin falls within a range of from 100:1.5 to 100:18.

[5] The microcapsule-based hardener for the epoxy resin according to any one of items [1] to [4], wherein the shell (S) has, in the structure thereof, a urea bond but has no carboxylate bond.

[6] The microcapsule-based hardener for the epoxy resin according to any one of items [1] to [5], wherein the hardener (H) for the epoxy resin further comprises a low molecular amine compound (B).

[7] The microcapsule-based hardener for the epoxy resin according to item [6], wherein the low molecular amine compound (B) is an imidazole.

[8] The microcapsule-based hardener for the epoxy resin according to any one of items [1] to [7], wherein the hardener (H) for the epoxy resin is a solid at 25° C.

[9] The microcapsule-based hardener for the epoxy resin according to any one of items [1] to [8], wherein the shell (S) comprises a reaction product available using, as a raw material, at least two compounds selected from the group consisting of isocyanate compounds, active hydrogen compounds, hardeners (h2) for an epoxy resin, epoxy resins (e2), and the low molecular amine compounds (B).

[10] The microcapsule-based hardener for the epoxy resin according to any one of items [1] to [9], wherein a total chlorine content in the hardener (H) for the epoxy resin, the epoxy resin (E1), or the epoxy resin (e2) is 2500 ppm or less.

[11] A masterbatch-based hardener composition for an epoxy resin comprising: the microcapsule-based hardener for the epoxy resin as claimed in any one of items [1] to [10] and; an epoxy resin (e3) at a (the microcapsule-based hardener for the epoxy resin):(the epoxy resin (e3)) ratio (mass ratio) ranging from 100:0.1 to 100:1000.

[12] The masterbatch-based hardener composition for the epoxy resin according to item [11], wherein a total chlorine content in the epoxy resin (e3) is 2500 ppm or less.

[13] The masterbatch-based hardener composition for the epoxy resin according to item [11] or [12], wherein an amount of a diol-terminated component present in the epoxy resin (e3) is from 0.001 to 30% by mass of a fundamental structural component of the epoxy resin (e3).

[14] A masterbatch-based hardener composition for an epoxy resin comprising: a microcapsule-based hardener for the epoxy resin, an epoxy resin (e3), and a highly-soluble epoxy resin (G), the microcapsule-based hardener for the epoxy resin being dispersed and mixed in the epoxy resin (e3) and/or the highly soluble epoxy resin (G), wherein:

the microcapsule-based hardener (H) for the epoxy resin has a core (C) formed using a hardener (H) for the epoxy resin as a starting material and a shell (S) covering the core (C) therewith, the hardener (H) for the epoxy resin has an amine adduct (A) and a low molecular amine compound as a main component, the amine adduct (A) is available by a reaction between an epoxy resin (e1) and an amine compound, and the hardener (H) for the epoxy resin has an average particle size exceeding 0.3 μm and not greater than 12 μm;

the highly soluble epoxy resin (G) has a fundamental structure in which a solubility parameter is from 8.65 to 11.00 and an inter-crosslink molecular weight after hardening of the fundamental structure is from 105 to 150, and has a diol-terminated component in an amount of from 0.01 to 20% by mass based on the fundamental structural component;

the microcapsule-based hardener for the epoxy resin and the epoxy resin (e3) are contained at a (the microcapsule-based hardener for the epoxy resin):(the epoxy resin (e3)) ratio (mass ratio) of from 100:0.1 to 100:1000;

the epoxy resin (e3) and the highly soluble epoxy resin (G) are contained at an (the epoxy resin (e3)):(the highly soluble epoxy resin (G)) ratio (mass ratio) of from 100:0.1 to 100:99; and a total chlorine content is 2500 ppm or less.

[15] The masterbatch-based hardener composition for the epoxy resin according to any one of items [11] to [14], further comprising at least one hardener (h3) for the epoxy resin selected from the group consisting of acid anhydrides, phenols, hydrazides, and guanidines, or a cyclic borate ester compound.

[16] The masterbatch-based hardener composition for the epoxy resin according to item [15], wherein the cyclic borate ester compound is 2,2'-oxybis(5,5'-dimethyl-1,3,2-dioxaborinane).

[17] The masterbatch-based hardener composition for the epoxy resin according to item [15] or [16], wherein a content of the cyclic borate ester compound is from 0.001 to 10% by mass.

[18] A one-part epoxy resin composition comprising: the masterbatch-based hardener composition for the epoxy resin as claimed in any one of items [11] to [17] and; an epoxy resin (e4) at a (the masterbatch-based hardener composition for the epoxy resin):(the epoxy resin (e4)) ratio (mass ratio) of from 100:0.001 to 100:1000.

[19] The one-part epoxy resin composition according to item [18], further comprising at least one hardener (h3) for the epoxy resin selected from the group consisting of acid anhydrides, phenols, hydrazides, and guanidines, or a cyclic borate ester compound.

[20] The one-part epoxy resin composition according to item [19], wherein the cyclic borate ester compound is 2,2'-oxybis(5,5'-dimethyl-1,3,2-dioxaborinane).

[21] The one-part epoxy resin composition according to item [19] or [20], wherein a content of the cyclic borate ester compound is from 0.001 to 10% by mass.

[22] A processed good obtained using the masterbatch-based hardener composition for the epoxy resin as claimed in any one of items [11] to [17] or the one-part epoxy resin composition as claimed in any one of items [18] to [21].

[23] The processed good according to item [22], which is selected from the group consisting of paste-like compositions, film-like compositions, adhesives, bonding pastes, bonding films, conductive materials, anisotropic conductive materials, anisotropic conductive films, insulating materials, sealing materials, coating materials, paint compositions, prepregs, heat conductive materials, separator materials for fuel cell, and overcoat materials for flexible wiring substrate.

Advantageous Effect of the Invention

The microcapsule-based hardener for the epoxy resin according to the present invention is excellent in storage stability and at the same time, excellent in reaction rapidity.

BEST MODE FOR CARRYING OUT THE INVENTION

The best mode for carrying out the present invention (hereinafter referred to as "embodiment of the present invention") will herein be described in detail. It should however be borne in mind that the present invention is not limited to or by the following embodiment but can be carried out with various modifications within the range of the gist of the invention.

(I) Microcapsule-based Hardener for Epoxy Resin

The microcapsule-based hardener for the epoxy resin according to the present embodiment has any one of the following characteristics (I-1) to (I-3):

(I-1) A microcapsule-based hardener for an epoxy resin which has a core (C) formed using a hardener (H) for the epoxy resin as a starting material and a shell (S) for covering the core (C) therewith, wherein the hardener (H) for the epoxy resin has an amine adduct (A) as a main component and the amine adduct (A) is available by a reaction between an epoxy resin (e1) and an amine compound; the hardener (H) for the epoxy resin has an average particle size exceeding 0.3 μm and not greater than 12 μm and a content of a small-particle-size hardener for the epoxy resin in the hardener (H) for the epoxy resin is from 0.1 to 15%, the average particle size of the small-particle-size hardener for the epoxy resin being 0.5 time or less of the average particle size of the hardener (H) for the epoxy resin; and the shell (S) has, at least on the surface thereof, a binding group (x) capable of absorbing infrared rays having a wave number of from 1630 to 1680 cm$^{-1}$, a binding group (y) capable of absorbing infrared rays having a wave number of from 1680 to 1725 cm$^{-1}$, and a binding group (z) capable of absorbing infrared rays having a wave number of from 1730 to 1755 cm$^{-1}$.

(I-2) A microcapsule-based hardener for an epoxy resin which has a core (C) formed using a hardener (H) for the epoxy resin as a starting material and a shell (S) for covering the core (C) therewith, wherein the hardener (H) for the epoxy resin has an amine adduct (A) as a main component and the amine adduct (A) is available by a reaction between an epoxy resin (e1) and an amine compound; the hardener (H) for the epoxy resin has an average particle size exceeding 0.3 μm and not greater than 12 μm and the hardener (H) for the epoxy resin has a specific surface area of from 1 to 25 m$^2$/g; and the shell (S) has, at least on the surface thereof, a binding group (x) capable of absorbing infrared rays having a wave number of from 1630 to 1680 cm$^{-1}$, a binding group (y) capable of absorbing infrared rays having a wave number of from 1680 to 1725 cm$^{-1}$, and a binding group (z) capable of absorbing infrared rays having a wave number of from 1730 to 1755 cm$^{-1}$.

(I-3) A microcapsule-based hardener for an epoxy resin which has a core (C) formed using a hardener (H) for the epoxy resin as a starting material and a shell (S) for covering the core (C) therewith, wherein the hardener (H) for the epoxy resin has an amine adduct (A) as a main component and the amine adduct (A) is available by a reaction between an epoxy resin (e1) and an amine compound; the hardener (H) for the epoxy resin has an average particle size exceeding 0.3 μm and not greater than 10 μm; and the shell (S) has, in a structure thereof, a urea bond but does not have an ester bond and a ratio of the thickness of the shell (S) to the average particle size of the hardener (H) for the epoxy resin falls within a range of from 100:1.5 to 100:18.

[Core (C)]

The core (C) in the present embodiment is formed using a hardener (H) for an epoxy resin as a starting material. The hardener (H) for the epoxy resin has an amine adduct (A) as a main component. The amine adduct (A) is available by the reaction between an epoxy resin (e1) and an amine compound.

The term "main component" as used herein means that a total amount of a specific component in a composition containing the specific component is 50% by mass or greater, preferably 60% by mass or greater, more preferably 80% by mass or greater, even 100% by mass or greater.

Examples of the epoxy resin (e1) mat include monoepoxy compounds and polyepoxy compounds. The monoepoxy compound and the polyepoxy compound may be used in combination.

Examples of the monoepoxy compounds may include butyl glycidyl ether, hexyl glycidyl ether, phenyl glycidyl ether, allyl glycidyl ether, para-tert-butylphenyl glycidyl ether, ethylene oxide, propylene oxide, para-xylyl glycidyl ether, glycidyl acetate, glycidyl butyrate, glycidyl hexoate, glycidyl benzoate and the like. They may be used either singly or in combination of two or more thereof.

Examples of the polyepoxy compounds may include glycidyl-based epoxy resins, for example, glycidyl-based bisphenolic epoxy resins obtained by glycidylating a bisphenol such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, or tetrafluorobisphenol A; epoxy resins obtained by glycidylating another divalent phenol such as biphenol, dihydroxynaphthalene, or 9,9-bis(4-hydroxyphenyl)fluorine; epoxy resins obtained by glycidylating a trisphenol such as 1,1,1-tris(4-hydroxyphenyl)methane, or 4,4-(1-(4-(1-(4-hydroxyphenyl)-1-methylethyl)phenyl)ethylidene)bisphenol; epoxy resins obtained by glycidylating a tetrakisphenol such as 1,1,2,2-tetrakis(4-hydroxyphenyl)ethane; novolac-based epoxy resins obtained by glycidylating a novolac such as phenolic novolac, cresol novolac, bisphenol A novolac, brominated phenolic novolac, or brominated bisphenol A novolac; epoxy resins obtained by glycidylating a polyhydric phenol, aliphatic ether-based epoxy resins obtained by glycidylating a polyol such as glycerin, or polyethylene glycol; ether-ester-based epoxy resins obtained by glycidylating a hydroxycarboxylic acid such as p-oxybenzoic acid or β-oxynaphthoic acid, ester-based epoxy resins obtained by glycidylating a polycarboxylic acid such as phthalic acid or terephthalic acid, glycidylated products of an amine compound such as 4,4'-diaminodiphenylmethane or m-aminophenol; and amine-based epoxy resins such as triglycidyl isocyanurate; and alicyclic epoxides such as 3,4-epoxycyclohexylmethyl-3',4'-epoxycyclohexane carboxylate. They may be used either singly or in combination of two or more thereof.

As the epoxy resin (e1), the polyepoxy compounds are preferred in order to enhance storage stability of an epoxy resin composition. Among the polyepoxy compounds, the glycidyl-based epoxy resins are preferred from the viewpoint of the productivity of an amine adduct (a markedly high productivity). For improving adhesion properties or heat resistance of a hardened product further, the epoxy resins obtained by glycidylating a polyhydric phenol, especially bisphenolic epoxy resins are preferred. Specific preferred examples of the epoxy resins may include the epoxy resin obtained by glycidylating bisphenol A and the epoxy resin obtained by glycidylating bisphenol F, with the epoxy resin obtained by glycidylating bisphenol A being more preferred. They may be used either singly or in combination.

From the viewpoint of obtaining the epoxy resin composition well-balanced between hardening property and storage stability, a total chlorine content in the epoxy resin (e1) is preferably 2500 ppm or less, more preferably 2000 ppm or less, more preferably 1500 ppm or less, more preferably 800 ppm or less, more preferably 400 ppm or less, more preferably 180 ppm or less, more preferably 100 ppm or less, more preferably 80 ppm or less, still more preferably 50 ppm or less.

From the viewpoint of facilitating the control of a shell forming reaction, a total chlorine content in the epoxy resin (e1) is preferably 0.1 ppm or greater, more preferably 0.02 ppm or greater, more preferably 0.05 ppm or greater, more preferably 0.1 ppm or greater, more preferably 0.2 ppm or greater, still more preferably 0.5 ppm or greater. The upper limit is preferably 200 ppm or less, more preferably 80 ppm or less, still more preferably 50 ppm or less. When the total chlorine content is 0.1 ppm or greater, the shell forming reaction is performed on the surface of the hardener efficiently, making it possible to obtain a shell excellent in storage stability.

The term "total chlorine content" as used herein means a total amount of organic chlorines and inorganic chlorines contained in the compound or the composition and it is a mass value based on the compound or the composition.

The total chlorine content in the epoxy resin (e1) can be determined in the following manner. First, an epoxy resin is extracted from an epoxy resin composition by using xylene (washing and filtration are repeated until the disappearance of the epoxy resin). The filtrate is then distilled under a reduced pressure at 100° C. or less to obtain an epoxy resin to be analyzed. From 1 to 10 g of the epoxy resin sample thus obtained is weighed precisely so that a titer is from 3 to 7 ml. The sample is then dissolved in 25 ml of ethylene glycol monobutyl ether. To the resulting solution is added 25 ml of a propylene glycol solution of 1N KOH. After boiling for 20 minutes, the epoxy resin solution is titrated with an aqueous solution of silver nitrate. The total chlorine content can be determined by the calculation using the titer.

Of all the chlorines, chlorine contained in a 1,2-chlorohydrin group is generally referred to as "hydrolyzable chlorine" and a content of the hydrolyzable chlorine in the epoxy resin (e1) is preferably 50 ppm or less, more preferably 20 ppm or less, still more preferably 10 ppm or less and, as a lower limit, preferably 0.01 ppm or greater, preferably 0.05 ppm or greater from the viewpoint of maintaining excellent electrical properties of hardened products obtained using the hardener while satisfying both high hardening property and high storage stability.

The hydrolyzable chlorine content is analyzed in the following manner. An epoxy resin to be analyzed is prepared in a similar manner to that used for the determination of the total chlorine content. The epoxy resin sample (3 g) thus obtained is dissolved in 50 ml of toluene. To the resulting solution is added 20 ml of a methanol solution of 0.1N KOH, followed by boiling for 15 minutes. The epoxy resin solution after boiling is titrated with an aqueous solution of silver nitrate. The hydrolyzable chlorine content can be determined by the calculation using the titer.

Examples of the amine compound (C) may include compounds having at least one primary amino group and/or secondary amino group but having no tertiary amino group and compounds having at least one tertiary amino group and at least one active hydrogen group, or the like.

Examples of the compounds having at least one primary amino group and/or secondary amino group but having no tertiary amino group may include primary amines having no tertiary amino group, such as methylamine, ethylamine, propylamine, butylamine, ethylenediamine, propylenediamine, hexamethylenediamine, diethylenetriamine, triethylenetetramine, ethanolamine, propanolamine, cyclohexylamine, isophoronediamine, aniline, toluidine, diaminodiphenylmethane, and diaminodiphenylsulfone; and secondary amines having no tertiary amino group, such as dimethylamine, diethylamine, dipropylamine, dibutylamine, dipentylamine, dihexylamine, dimethanolamine, diethanolamine, dipropanolamine, dicyclohexylamine, piperidine, piperidone, diphenylamine, phenylmethylamine and phenylethylamine. They may be used either singly or in combination of two or more.

In the compounds having at least one tertiary amino group and at least one active hydrogen group, examples of the active hydrogen group may include primary amino groups, secondary amino groups, hydroxyl group, thiol group, carboxylic acids, and hydrazide groups.

Examples of the compounds having at least one tertiary amino group and at least one active hydrogen group may include amino alcohols such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, methyldiethanolamine, triethanolamine, and N-β-hydroxyethylmorpholine; aminophenols such as 2-(dimethylaminomethyl)phenol and 2,4,6-tris(dimethylaminomethyl)phenol; imidazoles such as 2-methylimidazole, 2-ethyl-4-methylimidazole, 2-undecylimidazole, 2-heptadecylimidazole, 2-phenylimidazole, 1-aminoethyl-2-methylimidazole, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, and 1-(2-hydroxy-3-butoxypropyl)-2-ethyl-4-methylimidazole; imidazolines such as 1-(2-hydroxy-3-phenoxypropyl)-2-phenylimidazoline, 1-(2-hydroxy-3-butoxypropyl)-2-methylimidazoline, 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)imidazoline, tetramethylene-bis-imidazoline, 1,1,3-trimethyl-1,4-tetramethylene-bis-imidazoline, 1,3,3-trimethyl-1,4-tetramethylene-bisimidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, and 1,4-phenylene-bis-4-methylimidazoline; tertiary amino amines such as dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, N-methylpiperazine, N-aminoethylpiperazine, and diethylaminoethylpiperazine; aminomercaptans such as 2-dimethylaminoethanethiol, 2-mercaptobenzoimidazole, 2-mercaptobenzothiazole, 2-mercaptopyridine, and 4-mercaptopyridine; amino carboxylic acids such as N,N-dimethylaminobenzoic acid, N,N-dimethyl glycine, nicotinic acid, isonicotinic acid, and picolinic acid; and amino hydrazides such as N,N-dimethylglycin hydrazide, nicotinic hydrazide, and isonicotinic hydrazide. They may be used either singly or in combination of two or more thereof.

As the amine compound, the compounds having at least one tertiary amino group and at least one active hydrogen group are preferred because of superior balance between storage stability and hardening property. Of these, the imidazoles are preferred, with 2-methylimidazole and 2-ethyl-4-methylimidazole being especially preferred.

The amine adduct (A) is available by the reaction between the epoxy resin (e1) and the amine compound as described above.

The epoxy resin (e1) and the amine compound are added at a ratio (equivalent ratio), in terms of moles of the amine compound itself based on moles of the epoxy group of the epoxy resin (e1), of preferably from 0.5 to 10 equivalents, more preferably from 0.8 to 5 equivalents, still more preferably from 0.95 to 4 equivalents. By controlling the equivalent ratio to 0.5 or greater, the resulting microcapsule-based hardener for the epoxy resin can have improved hardening property. Control of the equivalent ratio to 0.5 or greater is preferred from the viewpoint of effectively controlling the average particle size of the hardener (H) for the epoxy resin or proportion of a small-particle-size hardener for the epoxy resin. Control of the equivalent ratio to not greater than 10 is advantageous from the viewpoint of economical recovery of an unreacted amine compound. The recovery of the unreacted amine compound is performed when a content of the low molecular amine compound (B) in the hardener (H) for the epoxy resin is adjusted.

The adduct (A) can be obtained by reacting, in the presence of a solvent if necessary, the epoxy resin (e1) and the amine compound at from 50 to 250° C. for from 0.1 to 10 hours.

As described above, the hardener (H) for the epoxy resin has the amine adduct (A) as a main component. The hardener (H) for the epoxy resin may contain a hardener other than the amine adduct (A).

Examples of the hardener other than the amine adduct (A) may include reaction products between one or more compounds selected from the group consisting of carboxylic acid compounds, sulfonic acid compounds, isocyanate compounds, and urea compounds and the amine compounds as described above as raw materials of the amine adduct (A); acid anhydride hardeners such as phthalic anhydride, hexahydrophthalic anhydride, tetrahydrophthalic anhydride and methylnadic anhydride; phenolic hardeners such as phenolic novolac, cresol novolac and bisphenol A novolac; mercaptan hardeners such as propylene glycol modified polymercaptan, thiogluconate ester of trimethylolpropane and polysulfide resin; halogenated boron salt hardeners such as ethylamine salt of trifluoroborane; quaternary ammonium salt hardeners such as phenolic salt of 1,8-diazabicyclo(5,4,0)-undeca-7-ene; urea hardeners such as 3-phenyl-1,1-dimethylurea; and phosphine hardeners such as triphenylphosphine and tetraphenylphosphonium tetraphenyl borate. They may be used either singly or in combination or two or more.

Examples of the carboxylic acid compounds may include succinic acid, adipic acid, sebacic acid, phthalic acid, and dimer acid. Examples of the sulfonic acid compound may include ethanesulfonic acid and p-toluenesulfonic acid. Examples of the urea compound may include urea, methylurea, dimethylurea, ethylurea, and t-butylurea. Examples of the isocyanate compound may include aliphatic diisocyanates, alicyclic diisocyanates, aromatic diisocyanates, aliphatic triisocyanates, and polyisocyanates.

Examples of the aliphatic diisocyanates may include ethylene diisocyanate, propylene diisocyanate, butylene diisocyanate, hexamethylene diisocyanate, and trimethylhexamethylene diisocyanate. Example of the alicyclic diisocyanates may include isophorone diisocyanate, 4,4'-dicyclohexylmethane diisocyanate, norbornane diisocyanate, 1,4-isocyanatocyclohexane, 1,3-bis(isocyanatomethyl)-cyclohexane, and 1,3-bis(isocyanatopropyl-2-yl)-cyclohexane. Example of the aromatic diisocyanates may include tolylene diisocyanate, 4,4'-diphenylmethane diisocyanate, xylene diisocyanate, and 1,5-naphthalene diisocyanate. Examples of the aliphatic triisocyanates may include 1,6,11-undecanetriisocyanate, 1,8-diisocyanato-4-isocyanatomethyloctane, 1,3,6-triisocyanatomethylhexane, 2-isocyanatoethyl 2,6-diisocyanatohexanoate, and 1-methyl-2-isocyanatoethyl 2,6-diisocyanatohexanoate. Examples of the polyisocyanate may include polymethylene polyphenyl polyisocyanate and polyisocyanate derived from the above-described diisocyanate compounds. Examples of the polyisocyanates derived from the above-described diisocyanates may include isocyanurate-based polyisocyanate, biuret-based polyisocyanate, urethane-based polyisocyanate, allophanate-based polyisocyanate, and carbodiimide-based polyisocyanate.

The hardener (H) for the epoxy resin preferably contains the amine adduct (A) and a low molecular amine compound (B) as main components in order to satisfy both the low temperature hardening property and storage stability of the resulting microcapsule-based hardener for the epoxy resin.

As the low molecular amine compound (B), one or more amine compounds given as examples of the raw material of the amine adduct (A) are usable. Of these, the imidazoles are preferred.

The proportion of the low molecular amine compound (B) in the total amount of the amine adduct (A) and the low molecular amine compound (B) is preferably from 0.001 to 3% by mass, more preferably from 0.01 to 2.5% by mass. When the proportion is 0.001% by mass or greater, a dense shell can be formed in the shell (S) forming reaction, leading to the preparation of the microcapsule-based hardener for the epoxy resin having high storage stability and solvent resistance. The proportions exceeding 3% by mass sometimes prevent stable control of the shell (S) forming reaction.

In the microcapsule-based hardener for the epoxy resin of the present embodiment having the above-described characteristics (I-1) or (I-2), the hardener (H) for the epoxy resin has preferably an average particle size exceeding 0.3 μm and not greater than 12 μm, preferably 0.4 μm or greater and not greater than 11 μm, still more preferably 0.5 μm or greater and not greater than 5 μm. In the microcapsule-based hardener for the epoxy resin having the above-described characteristics (I-3), the hardener (H) for the epoxy resin has preferably an average particle size exceeding 0.3 μm and not greater than 10

μm, preferably 0.4 μm or greater and not greater than 10 μm, still more preferably 0.5 μm or greater and not greater than 5 μm.

When the average particle size is 0.3 μm or greater, a microcapsule-based hardener for the epoxy resin having a core-shell structure (structure in which the core (C) is covered with the shell (S)) can be realized well. In short, the hardener having good storage stability can be obtained. In addition, when the average particle size is 0.3 μm or greater, the shell (S) covering the core (C) can be provided with appropriate hardness. In other words, upon use, the encapsulation environment of the shell (S) is released promptly and good reaction rapidity can be realized. When the average particle size is 12 μm or less, or 10 μm or less, the epoxy resin is hardened more uniformly during use and good physical properties of the hardened product can be maintained. When the average particle size is 5 μm or less, the epoxy resin can be hardened more uniformly during use.

In the microcapsule-based hardener for the epoxy resin of this embodiment having the above-described characteristics (I-1), a proportion of the small-particle-size hardener for the epoxy resin whose particle size is defined as 0.5 time or less of the average particle size of the hardener (H) for the epoxy resin (which may hereinafter be abbreviated as "small-particle-size content") is from 0.1 to 15%, preferably from 0.1 to 13%, more preferably from 0.1 to 10%.

Small-particle-size contents not greater than 15% are preferred from the viewpoint of achieving the improved latency and solvent resistance. Above all, when the average particle size of the hardener (H) for the epoxy resin having the amine adduct (A) and the low molecular amine compound (b) as main components is greater than 0.3 μm and not greater than 12 μm and the small-particle-size content of it is from 0.1 to 15%, it is possible to prepare a microcapsule-based hardener for the epoxy resin excellent in latency, long-term storage stability, and solvent resistance, having not only a high hardening property but also excellent reaction rapidity, and even excellent in the physical properties of hardened products using the hardening agent.

There are some methods for controlling the average particle size or the small-particle-size content of the hardener (H) for the epoxy resin. Examples thereof may include a method of grinding a hardener for the epoxy resin in the massive form while controlling the grinding precisely, a method of carrying out both coarse grinding and fine grinding, followed by classification with a precise classification apparatus to obtain a hardener having a desired particle size, and a method of controlling the conditions of a spraying and drying apparatus of a solution of a hardener for the epoxy resin.

Examples of the apparatus used for grinding may include ball mill, attritor, beads mill and jet mill. Any of them can be used as needed, but an impact-based grinder is popular. The impact-based grinder used in this embodiment is, for example, a jet mill such as a spiral liquid/powder impact-based jet mill or a powder impact-based counter jet mill. A jet mill is an apparatus for fine grinding of solid materials by causing them to collide with each other by utilizing a high-speed jet stream with air or the like as a medium. Grinding is controlled precisely by controlling temperature and humidity at the time of grinding, or a grinding amount per hour.

After grinding, the resulting ground product is precisely classified into particles having a predetermined particle size, for example, by using a sieve (for a standard 325-mesh or 250-mesh sieve) or a classifier, or a wind classifier for classifying particles depending on their specific gravity. As a classifier usable for the purpose of removing fine particles, a dry classifier is superior to a wet one. Examples of dry classifiers usable may include, but not limited to, "Elbow Jet" manufactured by Nittetsu Mining, "Fine Sharp Separator" manufactured by Hosokawa Micron, "Variable Impactor" manufactured by SANKYO DENGYO, "Spedic Classifier" manufactured by Seishin Enterprise, "Donaselec" manufactured by NIPPON DONALDSON, "YM Microcassette" manufactured by Yasukawa Shoji, "Turbo Classifier" manufactured by Nisshin Engineering, and various air separators, micron separators, microplexes, and acucuts.

As the spray dryer, the conventional spray dryers can be used.

The average particle size or small-particle-size content of the hardener (H) for the epoxy resin can also be controlled by a method of forming a plurality of hardeners (H) for the epoxy resin each having a specific average particle size and a specific small-particle-size content and mixing them as needed. The mixture can then be classified further.

Examples of a mixer to be used for the purpose of mixing of such powders may include a rotary vessel type mixer in which a vessel containing powders to be mixed is rotated; a fixed vessel type mixer in which mixing is effected by mechanical stirring or air-stream stirring without rotating the vessel containing the powders therein; and a complex type mixer in which the vessel containing powders therein is rotated while using another external force.

The term "average particle size" as used herein means an average particle size defined by a median diameter. More specifically, it means a stokes diameter as measured by laser diffraction/light scattering method while using "HORIBA LA-920" ("HORIBA LA-920", product of Horiba, Ltd., a particle size analyzer).

The term "small-particle-size content" as used herein is calculated from a particle-size-frequency histogram obtained in the above-described measurement of the average particle size.

No particular limitation is imposed on the shape of the hardener (H) for the epoxy resin and it may be any of spherical, granular, powdery or amorphous. Of these, from the viewpoint of viscosity reduction of the one-part epoxy resin composition, the hardener is preferably spherical. The term "spherical" embraces not only spherical but also amorphous with rounded edges.

In the microcapsule-based hardener for the epoxy resin having the characteristics (I-2) in the present embodiment, the hardener (H) for the epoxy resin has a specific surface area of from 1 to 25 $m^2/g$, preferably from 1.5 to 20 $m^2/g$, more preferably from 2 to 15 $m^2/g$, still more preferably from 2.5 to 10 $m^2/g$.

Control of the specific surface area to 25 $m^2/g$ or less is preferred from the viewpoint of achieving good latency and solvent resistance. On the other hand, control of the specific surface area to 1 $m^2/g$ or greater is preferred from the viewpoint of adjusting the average particle size to fall within a desired range. It is also preferred from the viewpoint of attaining reaction rapidity and obtaining a uniform hardened product and also preventing formation of secondary particles having a larger particle size during mixing of the composition. In short, when the specific surface area of the particles of the hardener (H) for the epoxy resin which are starting materials of the core (C) is from 1 to 25 $m^2/g$, it is possible to obtain a microcapsule-based hardener for the epoxy resin excellent in latency, long-term storage stability and solvent resistance, exhibiting not only high hardening property but even excellent reaction rapidity, and capable of providing a hardened product having excellent physical properties.

The term "specific surface area" in the present embodiment means a specific surface area as measured by a method based on BEG adsorption isotherm measurement using a nitrogen/helium gas.

The specific surface area of the hardener (H) for the epoxy resin can be controlled by some methods. For example, small-particle-size particles are removed by a classifier to relatively control the specific area of the hardener (H) for the epoxy resin because the specific surface area tends to be greater with an increase in the small-particle-size content. The specific surface area can also be controlled by using a proper grinding method, for example, by using not an opposed type grinder which is apt to cause relatively minute surface irregularities or cracks on the surface of the particles but a spiral type grinder which causes less surface irregularities or hardly causes cracks on the surface of the particles thus ground. A method of selecting reaction conditions between the epoxy resin (e1) and the amine compound when the amine adduct (A) is prepared is also effective. By properly controlling the equivalent ratio, reaction temperature or time, purification method and the like in the reaction, it is possible to prevent aggregation of particles, generation of a large amount of submicron size particles, and generation of a large number of minute pores or minute cracks on the surface of the ground particles, and to form the hardener (H) for the epoxy resin having a desired average particle size, small-particle-size content, and specific surface area.

The hardener (H) for the epoxy resin is preferably in the solid form at 25° C. in order to obtain an epoxy resin composition having high storage stability. Described specifically, the hardener (H) for the epoxy resin has a softening point of preferably exceeding 25° C. and not greater than 150° C., more preferably 40° C. or greater, still more preferably 60° C. or greater.

A total chlorine content in the hardener (H) for the epoxy resin is, from the viewpoint of obtaining the epoxy resin composition well balanced in hardening property and storage stability, preferably 2500 ppm or less, more preferably 2000 ppm or less, more preferably 1500 ppm or less, more preferably 800 ppm or less, more preferably 400 ppm or less, more preferably 180 ppm or less, more preferably 100 ppm or less, more preferably 80 ppm or less, still more preferably 50 ppm or less.

A total chlorine content in the hardener (H) for the epoxy resin is, from the viewpoint of facilitating the control of a shell forming reaction, preferably 0.01 ppm or greater, more preferably 0.02 ppm or greater, more preferably 0.05 ppm or greater, more preferably 0.1 ppm or greater, more preferably 0.2 ppm or greater, still more preferably 0.5 ppm or greater. The upper limit is preferably 200 ppm or less, more preferably 80 ppm or less, still more preferably 50 ppm or less. When the total chlorine content is 0.1 ppm or greater, the shell forming reaction proceeds efficiently on the surface of the hardener and a shell excellent in storage stability can be obtained.

[Shell (S)]

The microcapsule-based hardener for the epoxy resin in the present embodiment has the above-described core (C) and a shell (S) covering the core (C) therewith. The shell (S) preferably contains a reaction product available using at least two raw materials selected from the group consisting of isocyanate compounds, active hydrogen compounds, hardeners (h2) for the epoxy resin, epoxy resins (e2), and low molecular amine compounds (B).

The isocyanate compounds may contain the hardener (H) for the epoxy resin. The isocyanate compounds described as the raw material for the hardener other than the amine adduct (A) can be used.

Examples of the active hydrogen compounds may include water, compounds having at least one primary amino group and/or secondary amino group, and compounds having at least one hydroxyl group.

Examples of the compounds having at least one primary amino group and/or secondary amino group may include aliphatic amines, alicyclic amines, and aromatic amines.

Examples of the aliphatic amines may include alkylamines such as methylamine, ethylamine, propylamine, butylamine, and dibutylamine; alkylene diamines such as ethylene diamine, propylene diamine, butylene diamine, and hexamethylene diamine; polyalkylene polyamines such as diethylene triamine, triethylene tetraamine, and tetraethylene pentaamine; and polyoxyalkylene polyamines such as polyoxypropylene diamine and polyoxyethylene diamine. Examples of alicyclic amines may include cyclopropyl amine, cyclobutyl amine, cyclopentyl amine, cyclohexyl amine, and isophorone diamine. Examples of the aromatic amines may include aniline, toluidine, benzylamine, naphthylamine, diaminodiphenylmethane, and diaminodiphenyl sulfone.

Examples of the compounds having at least one hydroxyl group may include alcohol compounds and phenolic compounds.

Examples of the alcohol compounds may include monohydric alcohols such as methyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, dodecyl alcohol, stearyl alcohol, eicosyl alcohol, allyl alcohol, crotyl alcohol, propargyl alcohol, cyclopentanol, cyclohexanol, benzyl alcohol, cinnamyl alcohol, ethylene glycol monomethyl ether, ethylene glycol monoethyl ether, and diethylene glycol monobutyl ether; polyhydric alcohols such as ethylene glycol, polyethylene glycol, propylene glycol, polypropylene glycol, 1,3-butanediol, 1,4-butanediol, hydrogenated bisphenol A, neopentylglycol, glycerin, trimethylol propane, and pentaerythritol; and polyhydric alcohols such as compounds having, in one molecule thereof, at least two secondary hydroxyl groups, and available by a reaction between a compound having at least one epoxy group and a compound having at least one hydroxyl group, carboxyl group, primary or secondary amino group, or mercapto group. These alcohol compounds may be any of primary, secondary or tertiary alcohols.

Examples of the phenolic compounds may include monohydric phenols such as carbolic acid, cresol, xylenol, carvacrol, thymol, and naphthol and polyhydric phenols such as catechol, resorcin, hydroquinone, bisphenol A, bisphenol F, pyrogallol, and phloroglucin.

As the compounds having at least one hydroxyl group, polyhydric alcohols and polyhydric phenols are preferred from the viewpoint of latency and solvent resistance. Of these, polyhydric alcohols are especially preferred.

As the hardener (h2) for the epoxy resin, hardeners similar to the above-described hardener (H) for the epoxy resin are usable. The hardener (h2) for the epoxy resin and the hardener (H) for the epoxy resin may be the same or different, but they are preferably the same.

As the epoxy resin (e2), the epoxy resins similar to those described in the epoxy resin (e1), preferably polyepoxy compounds, can be used. The epoxy resin (e2) and the epoxy resin (e1) or an epoxy resin (e3) which will be described later may be the same or different. A plurality of the epoxy resins may be used in combination as the epoxy resin (e2).

The epoxy resin generally has, in the molecule, thereof, an impure terminal to which chlorine is bonded. Such an impure terminal may have an adverse effect on the electrical properties of a hardened product. A total chlorine content in the epoxy resin (e2) is therefore preferably 2500 ppm or less, more preferably 1500 ppm or less, still more preferably 500 ppm or less.

Although no particular limitation is imposed on the conditions of the reaction using, as raw materials, at least two compounds selected from the group consisting of the isocyanate compounds, active hydrogen compounds, the hardeners (h2) for the epoxy resin, the epoxy resins (e2), and the lower molecular amine compounds (B), the reaction is generally performed within a temperature range of from −10 to 150° C. for a reaction time from 10 minutes to 12 hours.

When the isocyanate compounds and the active hydrogen compounds are used, they are mixed at an (isocyanate group in the isocyanate compounds):(active hydrogen in the active hydrogen compounds) equivalent ratio of preferably from 1:0.1 to 1:1000.

When the hardeners (h2) for the epoxy resin and the epoxy resin (e2) are used, they are mixed preferably at a (hardeners (h2) for the epoxy resin):(epoxy resins (e2)) mass ratio of preferably from 1:0.001 to 1:1000, more preferably 1:0.01 to 1:100.

The above-described reaction may be performed in a dispersion medium if necessary. Examples of the dispersion medium may include solvents, plasticizers, and resins.

Examples of the solvents may include hydrocarbons such as benzene, toluene, xylene, cyclohexane, mineral spirit, and naphtha; ketones such as acetone, methyl ethyl ketone, and methyl isobutyl ketone; esters such as ethyl acetate, n-butyl acetate, and propylene glycol monomethyl ether acetate; alcohols such as methanol, isopropanol, n-butanol, butylcellosolve, and butylcarbitol; and water.

Examples of the plasticizers may include phthalic acid diester type plasticizers such as dibutyl phthalate and di(2-ethylhexyl)phthalate, aliphatic dibasic acid diester-based plasticizers such as di(2-ethylhexyl)adipate; phosphoric acid triester-based plasticizers such as tricresyl phosphate; and glycol ester-based plasticizers such as polyethylene glycol ester.

Examples of the resins may include silicone resins, epoxy resins, and phenolic resins.

In particular, the reaction between the epoxy resins (e2) and the hardeners (h2) for the epoxy resin is performed generally at from −10 to 150° C., preferably from 0 to 100° C., for from 1 to 16 hours, preferably for from 2 to 72 hours. As a dispersion medium, a solvent, a plasticizer, and the like are preferably used.

As the solvent or plasticizer, solvents usable in the above-described reaction of any two or more of the isocyanate compounds, active hydrogen compounds, the hardeners (h2) for the epoxy resin, the epoxy resins (e2), the low molecular amine compounds (B), or the plasticizers exemplified above can be used.

A proportion of the reaction product as described above in the shell (S) is generally 1% by mass or greater, preferably 50% by mass or greater and it may be even 100% by mass or greater.

In the microcapsule-based hardener for the epoxy resin in the present embodiment, the shell (S) can be formed so as to cover the core (C) therewith, for example, by the following process.

(a): a process of dissolving the shell (S) components in a solvent serving as a dispersion medium, and dispersing the particles of the hardener (H) for the epoxy resin in the resulting dispersion medium, thereby reducing the solubility of the shell (S) components and precipitating the shell (S) on the surface of the hardener (H) for the epoxy resin.

(b): a process of dispersing the particles of the hardener (H) for the epoxy resin serving as the starting material of the core (C) and adding materials for forming the shell to the resulting dispersion medium to precipitate them on the starting material particles.

(c): a process of adding raw materials of a shell forming material to a dispersion medium; and while using the surfaces of the starting material particles as a reaction site, forming the shell forming material on them.

The above described processes (b) and (c) are preferred because reaction and covering can be performed simultaneously. Examples of the dispersion medium may include solvents, plasticizers, and resins. As the solvents, plasticizers, and resins, those usable when obtaining the reaction product are usable.

Use of an epoxy resin as the dispersion medium is preferred because a masterbatch-based hardener composition for the epoxy resin can be obtained simultaneously with the formation of a shell.

The shell (S) forming reaction is performed generally within a temperature range of from −10 to 150° C., preferably from 0 to 100° C. for a reaction time from 10 minutes to 72 hours, preferably from 30 minutes to 24 hours.

In the microcapsule-based hardener for the epoxy resin of the present embodiment having the characteristics (I-3), a ratio of the thickness of the shell (S) to the average particle size of the hardener (H) for the epoxy resin is from 100:1.5 to 100:18, preferably from 100:1.8 to 100:15, more preferably from 100:2 to 100:10.

When the ratio of the thickness of the shell (S) is 1.5 or greater supposing that the average particle size of the hardener (H) for the epoxy resin is 100, the microcapsule-based hardener for the epoxy resin has improved storage stability. When the ratio of the thickness is 18 or less, on the other hand, the microcapsule-based hardener for the epoxy resin can maintain its reaction rapidity and in addition, a masterbatch-based hardener composition obtained using the hardener can maintain its storage stability and handling ease.

The term "thickness of the shell (S)" in the present embodiment is a value as measured with a transmission electron microscope.

The above-described thickness ratio can be controlled, for example, by a method of controlling addition amounts of shell (S) forming materials or by a method of controlling a reaction between the hardener (H) for the epoxy resin which oozes out from a film of the shell (S) and the epoxy resin (E2) which reacts when the shell (S) is formed. It is also possible to employ a method of controlling, in the above process of forming the shell (S) to cover the core (C) therewith, a proportion of the shell (S) forming material to be added or a method of controlling the temperature and/or time in the shell (S) formation.

In each of the microcapsule-based hardeners for the epoxy resin of the present embodiment having the characteristics (I-1) to (I-3), the shell (S) has, at least on the surface thereof, a binding group (x) capable of absorbing infrared rays having a wave number of from 1630 to 1680 $cm^{-1}$, a binding group (y) capable of absorbing infrared rays having a wave number of from 1680 to 1725 $cm^{-1}$, and a binding group (z) capable of absorbing infrared rays having a wave number of from 1730 to 1755 $cm^{-1}$. As the binding group (x), a urea bond is particularly useful. As the binding group (y), a burette bond is particularly useful. As the binding group (z), a urethane bond is particularly useful.

Presence of the binding groups (x), (y) and (z) can be confirmed by measuring infrared absorption with an infrared spectrophotometer (in particular, Fourier transform infrared spectrophotometer which may hereinafter be referred to as "FT-IR"). Presence of the binding groups (x), (y) and (z) at least on the surface of the shell (S) can be confirmed with microspectroscopic FT-IR (FT-IR using microspectroscopy).

The binding group (x) capable of absorbing infrared rays having a wave number of from 1630 to 1680 $cm^{-1}$, the binding group (y) capable of absorbing infrared rays having a wave number of from 1680 to 1725 $cm^{-1}$, and the binding group (z) capable of absorbing infrared rays having a wave number of from 1730 to 1755 $cm^{-1}$, which the shell (S) has, have concentrations within a range of from 1 to 1000 meq/kg, from 1 to 1000 meq/kg, and from 1 to 200 meq/kg, respectively. The term "concentration" as used herein means a value based on the microcapsule-based hardener for the epoxy resin. Concentrations of the binding group (x) equal to or greater than 1 meq/kg are advantageous for obtaining a capsule-based hardener having high resistance against a mechanical shear force. Concentrations not greater than 1000 meq/kg are advantageous for attaining high hardening property. The concentration range of the binding group (x) is more preferably from 10 to 300 meq/kg.

Concentrations of the binding group (y) equal to or greater than 1 meq/kg are advantageous for obtaining a capsule type hardener having high resistance against a mechanical shear force. Concentrations not greater than 1000 meq/kg are advantageous for attaining high hardening property. The concentration range of the binding group (y) is more preferably from 10 to 200 meq/kg.

Concentrations of the binding group (z) equal to or greater than 1 meq/kg are advantageous for forming a shell having high resistance against a mechanical shear force. Concentrations not greater than 200 meq/kg are advantageous for attaining high hardening property. The concentration range of the binding group (z) is more preferably from 5 to 100 meq/kg.

A ratio of the concentration of the binding group (z) to a total concentration of the binding group (x) and the binding group (y) of the shell (S) is, in terms of a mass ratio, from 100/1 to 100/100. Within this range, storage stability and hardening property can be satisfied simultaneously. The ratio is preferably from 100/2 to 100/80, more preferably from 100/5 to 100/60, still more preferably from 100/10 to 100/50. The concentrations of the binding groups (x), (y), and (z), and the ratio can be determined by the method disclosed in Patent Document 1.

A total thickness of regions where the binding groups (x), (y), and (z) of the shell (S) are present is, in terms of an average layer thickness, preferably from 5 to 1000 nm. The total thickness of 5 nm or greater provides storage stability, while that not greater than 1000 nm provides hardening property suitable for practical use. The thickness of the layer can be measured with a transmission electron microscope. The total thickness of regions where the binding groups are present is especially preferably from 10 to 100 nm in terms of an average layer thickness.

The shell (S) has, in the structure thereof, a urea bond. The shell (S) is preferably free from an ester bond, especially preferably free from a carboxylate bond. When the shell (S) has no carboxylate bond, damage of the shell (S) and deterioration of the storage stability which will otherwise occur due to the hydrolysis reaction of the carboxylate bond under a high humidity state can be prevented. In addition, after hardening of the epoxy resin composition, deterioration of the physical properties of the hardened product can be prevented.

It is preferred that the shell (S) has, in the structure thereof, both a burette bond and a urethane bond from the viewpoint of latency and solvent resistance.

(II) Masterbatch-based Hardener Composition for the Epoxy Resin

The masterbatch-based hardener composition for the epoxy resin according to the present embodiment has either one of the following characteristics (II-1) and (II-2).

(II-1) A masterbatch-based hardener composition for the epoxy resin containing the above-described microcapsule hardener for the epoxy resin and an epoxy resin (e3) at a (microcapsule-based hardener for the epoxy resin):(epoxy resin (e3)) mass ratio of from 100:0.1 to 100:1000.

(II-2) A masterbatch-based hardener composition for the epoxy resin containing the microcapsule-based hardener for the epoxy resin, an epoxy resin (e3), and a highly soluble epoxy resin (G), the microcapsule hardener for the epoxy resin being dispersed and mixed in the epoxy resin (e3) and/or the highly soluble epoxy resin (G), wherein:

the highly soluble epoxy resin (G) has a fundamental structure in which a solubility parameter is from 8.65 to 11.00 and an inter-crosslink molecular weight after hardening is from 105 to 150, and has a diol-terminated component in an amount of from 0.01 to 20% by mass based on a fundamental structural component;

the microcapsule-based hardener for the epoxy resin and the epoxy resin (e3) are contained at a (microcapsule-based hardener for the epoxy resin):(epoxy resin (e3)) mass ratio of from 100:0.1 to 100:1000; the epoxy resin (e3) and the highly soluble epoxy resin (G) are contained at a (epoxy resin (e3)):(highly soluble epoxy resin (G)) mass ratio of from 100:0.1 to 100:99; and a total chlorine content is 2500 ppm or less.

As the epoxy resin (e3), epoxy resins similar to those exemplified as the epoxy resin (e1) can be used. Of these, the polyepoxy compounds are preferred. A plurality of them may also be used in combination.

The epoxy resins obtained by glycidylating polyphenols are preferred from the standpoint of adhesion properties and heat resistance of products hardened using the hardener composition. In particular, bisphenolic epoxy resins are preferred, of which glycidylated bisphenol A and glycidylated bisphenol F are especially preferred.

In the present embodiment, the microcapsule type hardener for the epoxy resin and the epoxy resin (e3) are mixed at a (microcapsule-based hardener for the epoxy resin):(epoxy resin (e3)) mass ratio of generally from 100:0.1 to 100:1000, preferably from 100:1 to 100:100.

As described above, an impure terminal, in the molecule of the epoxy resin, to which chlorine has been bonded has an adverse effect on the electrical properties of the hardened products so that a total chlorine content in the epoxy resin (e3) is preferably 2500 ppm or less, more preferably 1500 ppm or less, still more preferably 500 ppm or less.

Also from the same viewpoint, a total chlorine content in the entirety of the masterbatch-based hardener composition for the epoxy resin is preferably 2500 ppm or less.

A diol-terminated impurity component in the epoxy resin (e3) is preferably from 0.001 to 30% by mass, more preferably from 0.01 to 25% by mass, more preferably from 0.1 to 20% by mass, more preferably from 0.5 to 18% by mass, still more preferably from 1.2 to 15% by mass, of a fundamental structural component in the epoxy resin (e3).

The term "diol-terminated impurity component" as used herein means an epoxy resin having a structure in which an epoxy group at either one or both of the ends is ring-opened to form 1,2-glycol. Reference literature is, for example, *Review: Epoxy Resin, vol. 1, Basic Part I*, published by The Japan Society of Epoxy Resin Technology. The fundamental structural component and the diol-terminated impurity component in the epoxy resin (e3) are analyzed with reference to a method described in the document cited in the *Review: Epoxy Resin, vol. 1, Basic Part I*, published by The Japan Society of Epoxy Resin Technology.

When the diol-terminated impurity component of the epoxy resin (e3) is 30% by mass or less of the fundamental structural component of the epoxy resin (e3), a hardened product can have improved water resistance. When it is 0.001% by mass or greater, on the other hand, the epoxy resin composition can have improved hardening property.

The proportion of the diol-terminated impurity component of the epoxy resin (e3) in the fundamental structural component of the epoxy resin (e3) can be determined by a method described later in the section of Examples.

The masterbatch-based hardener composition for the epoxy resin having the characteristics (II-2), on the other hand, contains a highly soluble epoxy resin (G) characterized in that the fundamental structure thereof has a solubility parameter of from 8.65 to 11.00 and an inter-crosslink molecular weight after hardening of from 105 to 150, and a diol-terminated component present in the highly soluble epoxy resin (G) is from 0.01 to 20% by mass based on its fundamental structural component.

The solubility parameter of the fundamental structure is a value determined by substituting the parameter shown in Table 1 into the following equation (1) with regard to the fundamental structure of the highly soluble epoxy resin (G) which undergoes no cleavage of the epoxy group.

[Equation 1]

$$SP = \frac{\text{Sum of } Fi}{\text{Molecular weight}} \quad (1)$$

TABLE 1

| Structure | Fi |
|---|---|
| —CH$_3$ | 147.3 |
| —CH$_2$— | 131.5 |
| >—CH— | 85.99 |
| >C< | 38.52 |
| CH$_2$= | 126.54 |
| —CH= | 121.53 |
| >C= | 84.51 |
| —CH= (aromatic ring) | 117.12 |
| —C≡ | 98.12 |
| —O— (ether, acetal) | 114.98 |
| —O— (epoxy) | 176.20 |
| —COO— | 326.58 |
| >C=O | 262.96 |
| —CHO | 292.64 |
| (CO)$_2$O | 567.29 |
| —OH | 225.84 |
| —H (acidic) | −50.47 |
| —OH (aromatic ring) | 170.99 |
| —NH$_2$ | 226.56 |
| —NH— | 180.03 |
| C≡N | 254.56 |
| —NCO | 358.66 |
| —S— | 209.42 |
| Cl$_2$ | 342.67 |
| Cl, primary | 205.06 |
| Cl, secondary | 208.27 |

TABLE 1-continued

| Structure | Fi |
|---|---|
| Cl, aromatic ring | 161.0 |
| Br | 257.8 |
| Br, aromatic ring | 205.60 |
| F | 41.33 |

Specific examples of the highly soluble epoxy resin (G) which is used in the present embodiment and whose fundamental structure has a solubility parameter of from 8.6 to 11.00 may include 1,2-dihydroxybenzene, 1,3-dihydroxybenzene, 1,4-dihydroxybenzene, 3-methyl-1,2-dihydroxybenzene, 4-methyl-1,2-dihydroxybenzene, 2-methyl-1,3-dihydroxybenzene, 4-methyl-1,3-dihydroxybenzene, 2-methyl-1,4-dihydroxybenzene, 3-ethyl-1,2-dihydroxybenzene, 4-ethyl-1,2-dihydroxybenzene, 2-ethyl-1,3-dihydroxybenzene, 4-ethyl-1,3-dihydroxybenzene, 2-ethyl-1,4-dihydroxybenzene, 3-propyl-1,2-dihydroxybenzene, 4-propyl-1,2-dihydroxybenzene, 2-propyl-1,3-dihydroxybenzene, 4-propyl-1,3-dihydroxybenzene, 2-propyl-1,4-dihydroxybenzene, 3-isopropyl-1,2-dihydroxybenzene, 4-isopropyl-1,2-dihydroxybenzene, 2-isopropyl-1,3-dihydroxybenzene, 4-isopropyl-1,3-dihydroxybenzene, 2-isopropyl-1,4-dihydroxybenzene, 3-tertiary-butyl-1,2-dihydroxybenzene, 4-tertiary-butyl-1,2-dihydroxybenzene, 2-tertiary-butyl-1,3-dihydroxybenzene, 4-tertiary-butyl-1,3-dihydroxybenzene, 2-tertiary-butyl-1,4-dihydroxybenzene, 3-butyl-1,2-dihydroxybenzene, 4-butyl-1,2-dihydroxybenzene, 2-butyl-1,3-dihydroxybenzene, 4-butyl-1,3-dihydroxybenzene, 2-butyl-1,4-dihydroxybenzene, 1,2-dihydroxynaphthalene, 1,3-dihydroxynaphthalene, 1,4-dihydroxynaphthalene, 1,6-dihydroxynaphthalene, 1,7-dihydroxynaphthalene, 1,8-dihydroxynaphthalene, 2,3-dihydroxynaphthalene, 2,4-dihydroxynaphthalene, 2,6-dihydroxynaphthalene, 2,7-dihydroxynaphthalene, and a glycidyl compound of 1,8-dihydroxynaphthalene. Of these, 1,3-dihydroxybenzene, 2-methyl-1,4-dihydroxybenzene, 2-tertiary-butyl-1,4-dihydroxybenzene, and the like are preferred.

The inter-crosslink molecular weight of the fundamental structure of the highly soluble epoxy resin (G) after hardening is from 105 to 150, preferably from 107 to 145, more preferably from 108 to 140, more preferably from 109 to 130, still more preferably from 110 to 120.

Inter-crosslink molecular weights not greater than 150 are preferred from the viewpoint of maintaining heat resistance of hardened products, reducing shrinkage during hardening, and maintaining adhesive force between adherends. Inter-crosslink molecular weights equal to or greater than 105 are, on the other hand, preferred from the viewpoint of preventing hardened products from becoming fragile.

The inter-crosslink molecular weight is determined by dividing a monomer molecular weight of the fundamental structural formula of the highly soluble epoxy resin by the number of epoxy groups contained in the fundamental structural formula.

In the highly soluble epoxy resin (G), a diol-terminated component present therein is from 0.01 to 20% by mass, preferably from 0.01 to 15% by mass, more preferably from 0.1 to 10% by mass, still more preferably from 0.2 to 8% by mass based on the fundamental structural component.

Amounts not greater than 20 parts by mass are preferred from the standpoint of preventing deterioration of water resistance of the hardened products. Amounts equal to or greater than 0.01% by mass, on the other hand, are preferred from the standpoint of preventing deterioration of the hardening property of the epoxy resin composition.

The amount of the diol-terminated component present in the resin is determined by the method described later in the section of Examples.

In the present embodiment, the epoxy resin (e3) and the highly soluble epoxy resin (G) are mixed at an (epoxy resin (e3):(highly soluble epoxy resin (G)) mass ratio of generally from 100:0.1 to 100:99, preferably from 100:5 to 100:60, more preferably from 100:10 to 100:50, still more preferably from 100:15 to 100:40.

The amount of the highly soluble epoxy resin (G) is preferably 0.1 parts by mass or greater based on 100 parts by mass of the epoxy resin (e3) from the viewpoint that the resulting masterbatch-based composition exhibits sufficient low-temperature hardening property and storage stability. The amount is, on the other hand, preferably 99 parts by mass or less from the viewpoint of suppressing an increase in a water absorption percentage.

The masterbatch hardener composition for the epoxy resin can contain additives such as extenders, reinforcing materials, fillers, pigments, conductive fine particles, organic solvents, reactive diluents, non-reactive diluents, resins, crystalline alcohols, coupling agents, other additives, and cyclic borate ester compounds.

Examples of the fillers may include coal tar, glass fiber, asbestos fiber, boron fiber, carbon fiber, cellulose, polyethylene powder, polypropylene powder, quartz powder, mineral silicate salt, mica, asbestos powder, and slate powder.

Examples of the pigment may include kaolin, aluminium oxide trihydrate, aluminium hydroxide, chalk powder, plaster, calcium carbonate, antimony trioxide, penton, silica, aerosol lithopone, barites, and titanium dioxide.

Examples of the conductive fine particles may include carbon black, graphite, carbon nanotube, fraren, iron oxide, gold, silver, aluminium powder, iron powder, nickel, copper, zinc, chromium, solder, nano-size metal crystals, and intermetallic compounds.

Any of them can be used effectively depending on applications thereof.

Examples of the organic solvent may include toluene, xylene, methyl ethyl ketone, methyl isobutyl ketone, ethyl acetate, and butyl acetate.

Examples of the reactive diluent may include butyl glycidyl ether, N,N'-diglycidyl-o-toluidine, phenyl glycidyl ether, styrene oxide, ethylene glycol diglycidyl ether, propylene glycol diglycidyl ether, and 1,6-hexanediol diglycidyl ether.

Examples of the non-reactive diluent may include dioctyl phthalate, dibutyl phthalate, dioctyl adipate, and petroleum solvent.

Examples of the resin may include polyester resins, polyurethane resins, acrylic resins, polyether resins, melamine resins, and modified epoxy resins such as urethane modified epoxy resins, rubber modified epoxy resins, and alkyd modified epoxy resins.

Examples of the crystalline alcohol may include 1,2-cyclohexanediol, 1,3-cyclohexanediol, 1,4-cyclohexanediol, pentaerythritol, sorbitol, sucrose, and trimethylolpropane.

As the other additives, a hardener (h3) for the epoxy resin can be added.

As such hardener (h3) for the epoxy resin, amine-based hardeners for the epoxy resin similar to those exemplified in the hardener (H) for the epoxy resin and also any hardeners for the epoxy resin used generally as a hardener for the epoxy resin can be used. Of these, at least one hardener for the epoxy resin selected from the group consisting of acid anhydride hardeners, phenolic hardeners, hydrazide hardeners, and guanidine hardeners is preferred from the viewpoint of bond strength, Tg, and easy mixing.

Examples of the acid anhydride hardeners may include phthalic anhydride, trimellitic anhydride, pyromellitic anhydride, hexahydrophthalic anhydride, tetrahydrophthalic anhydride, 3-chlorophthalic anhydride, 4-chlorophthalic anhydride, benzophenone tetracarboxylic anhydride, succinic anhydride, methylsuccinic anhydride, dimethylsuccinic anhydride, dichlorosuccinic anhydride, methylnadic anhydride, dodecylsuccinic anhydride, chlorendic anhydride, and maleic anhydride.

Examples of the phenolic hardeners may include phenolic novolac, cresol novolac, and bisphenol A novolac.

Examples of the hydrazide hardeners may include succinic dihydrazide, adipic dihydrazide, phthalic dihydrazide, isophthalic dihydrazide, terephthalic dihydrazide, p-oxybenzoic dihydrazide, salicylic hydrazide, phenylaminopropionic hydrazide, and maleic dihydrazide.

Examples of the guanidine hardeners may include dicyandiamide, methylguanidine, ethylguanidine, propylguanidine, butylguanidine, dimethylguanidine, trimethylguanidine, phenylguanidine, diphenylguanidine, and toluoylguanidine.

The hardener (h3) for the epoxy resin and the hardener (H) for the epoxy resin which is a starting material of the core (C) may be the same, but they are preferably different from each other from the standpoint of easy mixing of the composition. A content of the other additives in the masterbatch-based hardener composition for the epoxy resin or the one-part epoxy resin composition which will be described later is generally less than 30% by mass.

When the cyclic borate ester compound is added, the resulting masterbatch-based hardener composition for the epoxy resin can have improved storage stability.

The term "cyclic borate ester compound" as used herein means a compound containing, in the cyclic structure thereof, boron. As such a cyclic borate ester compound, 2,2'-oxybis(5,5'-dimethyl-1,3,2-oxaborinane) is preferred.

A content of the cyclic borate ester compound in the masterbatch-based hardener composition for the epoxy resin or the one-part epoxy resin composition which will be described later is generally from 0.001 to 10 mass %.

The masterbatch-based hardener composition for the epoxy resin can be prepared, for example, by dispersing the microcapsule-based hardener for the epoxy resin in the epoxy resin (e3), or in the epoxy resin (e3) and the highly soluble epoxy resin (G) with a triple roll mill; or by carrying out a shell (S) forming reaction on the surface of the hardener (H) for the epoxy resin in the epoxy resin (e3) or in the epoxy resin (e3) and the highly soluble epoxy resin (G) to simultaneously yield a microcapsule-based hardener for the epoxy resin and the masterbatch-based hardener for the epoxy resin. The latter process having high productivity is preferred.

Examples of a process for incorporating the highly soluble epoxy resin (G) may include a process of uniformly mixing the epoxy resin (e3) and the highly soluble epoxy resin (G) in advance; a process of adding the highly soluble epoxy resin (G) to an epoxy resin composition obtained by dispersing the microcapsule-based hardener for the epoxy resin in the epoxy resin (e3) and then uniformly dispersing and mixing the resulting mixture; and a process of using, in the above-described process of carrying out a shell (S) forming reaction on the surface of a hardener for epoxy resin in an epoxy resin to simultaneously yield a microcapsule-based hardener for the epoxy resin and masterbatch-based hardener for the epoxy resin, a mixture of the epoxy resin (e3) and the highly soluble epoxy resin (G) as the epoxy resin.

(III) One-Part Epoxy Resin Composition

The one-part epoxy rein composition according to the present embodiment contains the materbatch-based hardener composition for the epoxy resin and an epoxy resin (e4).

As the epoxy resin (e4), hardeners for the epoxy resin similar to those exemplified in the epoxy resin (e1) can be used. Of these, the polyepoxy compounds are preferred.

The epoxy resin (e4) is added at a (masterbatch-based hardener composition for the epoxy resin):(epoxy resin (e4)) mass ratio generally ranging from 100:0.001 to 100:1000, preferably from 100:0.01 to 100:1000

The one-part epoxy resin composition can be prepared utilizing the processes mentioned as the preparation processes of the masterbatch-based hardener composition for the epoxy resin.

The masterbatch-based hardener composition for the epoxy resin or the one-part epoxy resin composition according to the present embodiment can be provided in the paste form or film form and can be used for any purpose (processed good).

In particular, it is useful not only as an adhesive and/or a bonding paste and a bonding film but also as a conductive material, an anisotropic conductive material, an insulating material, a sealing material, a coating material, a paint composition, a prepreg, a thermal conductive material, and a sealing material for fuel cell.

The adhesive and/or the bonding paste and the bonding film are useful, for example, as a liquid adhesive, a film-type adhesive, or a die bonding material. Examples of preparation processes of the film-type adhesive may include those described in Japanese Patent Laid-Open No. Sho 62-141083 and Japanese Patent Laid-Open No. Hei 05-295329. More specifically, a bonding film which is inert at ordinary temperature and exhibits adhesion properties by the action of a latent hardener caused by heating can be obtained by dissolving/mixing/dispersing a solid epoxy resin, a liquid epoxy resin, and a solid urethane resin in toluene to give a resin content of, for example, 50% by mass; adding/dispersing, in the resulting solution, the masterbatch-based hardener composition for the epoxy resin according to the present embodiment in an amount of, for example, 30% by mass to prepare a varnish; applying the resulting varnish onto, for example, a polyethylene terephthalate release substrate having a thickness of 50 μm to give a dry film thickness of 30 μm; and drying off the toluene from the varnish.

Examples of the conductive materials may include conductive films and conductive pastes, while those of the anisotropic conductive materials may include anisotropic conductive films and anisotropic conductive pastes. They are prepared by a process as described, for example, in Japanese Patent Laid-Open No. Hei 01-113480. Described specifically, they can be prepared, for example, in accordance with the above-described process for preparing a bonding film, by mixing/dispersing conductive materials or anisotropic conductive materials during preparation of a varnish, applying the mixture/dispersion to a release substrate, and then drying it. Examples of conductive particles usable here may include solder particles, nickel particles, nano-size metal crystals, particles obtained by covering the surface of a metal with another metal, metal particles such as copper-silver gradient particles, and particles obtained by covering particles of a resin such as styrene resin, urethane resin, melamine resin, epoxy resin, acrylic resin, phenolic resin, and styrene-butadiene resin with a conductive thin film of gold, nickel, silver, copper or solder. In general, conductive particles are spherical fine particles with a diameter of from about 1 to 20 μm. When a conductive film is prepared, polyester, polyethylene, polyimide, polytetrafluoroethylene, or the like can be used as a substrate. An anisotropic conductive film may be prepared by applying a varnish solvent containing conductive particles to such a substrate, and drying off the solvent from the varnish.

Examples of the insulating material may include insulating adhesive films and insulating adhesive pastes. Insulating adhesive films which are insulating materials are available using the above-described bonding film. Insulating adhesive pastes are available by using a sealing material or adding an insulating filler, of the above-described fillers, to the one-part epoxy resin composition.

The sealing material is, for example, a solid sealing material, a liquid sealing material, and a film-like sealing material. The liquid sealing material is useful as an underfill material, a potting material, and a dam material. The preparation process of a sealing material is described, for example, in Japanese Patent Laid-Open No. Hei 5-43661 and Japanese Patent Laid-Open No. 2002-226675. More specifically, the sealing material can be obtained by uniformly mixing a bisphenol A-based epoxy resin, an acid anhydride as a hardener, methylhexahydrophthalic anhydride as another hardener, and a spherical fused silica powder, adding the masterbatch-based hardener composition for the epoxy resin obtained according to the present invention to the mixture, and uniformly mixing the resulting mixture.

Examples of the coating material may include coating materials for electronic materials, overcoat materials for covering printed wiring boards, and interlayer insulating resin compositions of printed circuit boards. The coating material can be prepared by various processes, for example, those described in Japanese Patent Publication No. Hei 4-6116, Japanese Patent Laid-Open No. Hei 7-304931, Japanese Patent Laid-Open No. Hei 8-64960, and Japanese Patent Laid-Open No. 2003-246838. More specifically, a filler such as silica selected from fillers, a bisphenol A-based epoxy resin, a phenoxy resin, a rubber-modified epoxy resin, and the like are mixed. The masterbatch-based hardener composition for the epoxy resin according to the present embodiment is then added and a 50% solution of the resulting mixture is prepared using methyl ethyl ketone (MEK). The solution is applied onto a polyimide film to a thickness of 50 μm, on which a copper foil is placed, followed by lamination at from 60 to 150° C. The resulting laminate is hardened by heating at from 180 to 200° C. to obtain a laminate with the interlayer thereof coated with an epoxy resin composition.

A paint composition can be prepared, for example, by the process described in Japanese Patent Laid-Open No. Hei 11-323247 and Japanese Patent Laid-Open No. 2005-113103. More specifically, an epoxy paint composition can be obtained by mixing titanium dioxide, talc and the like with a bisphenol A-based epoxy resin, adding a 1:1 methyl isobutyl ketone (MIBK):xylene solvent mixture, stirring and mixing the resulting mixture to obtain a base resin, adding the masterbatch-based hardener composition for the epoxy resin obtained according to the present embodiment to the resulting base resin, and uniformly dispersing the resulting mixture.

The prepreg can be prepared, as described for example in Japanese Patent Laid-Open No. Hei 09-71633 or WO98/44017, by a process of impregnating a reinforcing substrate with an epoxy resin composition, followed by heating. Examples of the solvent for the varnish used for impregnation may include methyl ethyl ketone, acetone, ethyl cellosolve, methanol, ethanol, and isopropyl alcohol. These solvent preferably do not remain in the prepreg. Although no particular limitation is imposed on the reinforcing substrate, examples thereof may include paper, glass cloth, nonwoven glass cloth, aramid cloth, and liquid crystal polymer. Although the contents of the resin composition and the reinforcing substrate are also not particularly limited, it is preferred to adjust the resin content in the prepreg to from 20 to 80% by mass.

The thermal conductive material can be prepared, for example, by the process described in Japanese Patent Laid-Open No. Hei 06-136244, Japanese Patent Laid-Open No. Hei 10-237410, or Japanese Patent Laid-Open No. 2000-3987. More specifically, a thermal conductive resin paste can be obtained by mixing an epoxy resin as a thermosetting resin, a phenolic novolac hardener as a hardener, and graphite powder as a thermal conductive filler, kneading the resulting mixture uniformly, and then adding the masterbatch-based hardener composition for epoxy resin of the present invention.

The sealing material for fuel cell can be prepared, for example, by the process described in Japanese Patent Laid-Open No. 2002-332328 or Japanese Patent Laid-Open No. 2004-75954. More specifically, a sealing-material forming material composition for fuel cell is prepared by using an artificial graphite material as a conductive material and a liquid epoxy resin, a biphenyl epoxy resin, a resol type phenolic resin, or a novolac type phenolic resin as a thermosetting resin; mixing the raw materials in a mixer, adding the masterbatch-based hardener composition for the epoxy resin according to the present embodiment to the resulting mixture; and dispersing the mixture uniformly. Then, by compression-molding of the resulting forming material composition at a mold temperature of from 170 to 190° C. and a molding pressure of from 150 to 300 kg/cm², a sealing material for fuel cell excellent in practical conductivity, good gas impermeability, and excellent molding processability can be obtained.

The overcoat material for flexible wiring substrate can be prepared, for example, by the process described in WO00/64960 or Japanese Patent Laid-Open No. 2006-137838. More specifically, the epoxy resin composition is prepared by mixing the epoxy resin, carboxyl-modified polybutadiene reactive with the epoxy resin, rubber particles, and the like as needed as raw materials for preparing the overcoat material for flexible wiring substrate, adding the masterbatch-based hardener composition for the epoxy resin according to the present invention as a curing accelerator, and uniformly dispersing the resulting mixture. The resulting epoxy resin composition is dissolved and dispersed in MEK to prepare an overcoat material solution for flexible wiring substrate having a solid concentration of 30% by mass. Succinic acid is dissolved, as a dicarboxylic acid, in pure water and the resulting solution is added, as a 5% by mass aqueous solution, to the overcoat material solution for flexible wiring substrate. The overcoat material solution for flexible wiring substrate is applied to a polyimide film having a thickness of 65 μm to give a dry film thickness of 25 μm, followed by drying at 150° C. for 20 minutes to yield the overcoat material for flexible wiring substrate.

EXAMPLES

The present embodiment will hereinafter be described more specifically by Examples and Comparative Examples. It should however be borne in mind that the present embodiment is not limited to or by the following Examples unless it departs from the gist of the present embodiment.

Preparation Examples 1-1 to 1-7

The epoxy resin and the amine compound were reacted at the concentration of a reaction solution and conditions of a reaction temperature described in Table 2 in the solvent described in Table 2. Then, the solvent was distilled off under a reduced pressure to obtain hardeners for epoxy resin h-1 to h-7 which had the amine adduct (A) or the amine adduct (A) and the low molecular amine compound (B) as the main component and were in the massive form. The evaluation results of the hardeners h-1 to h-7 for epoxy resin thus obtained in the massive form are also shown in Table 2.

TABLE 2

| Composition (equivalent)*) | | Preparation Examples | | | | | | |
|---|---|---|---|---|---|---|---|---|
| | | 1-1 | 1-2 | 1-3 | 1-4 | 1-5 | 1-6 | 1-7 |
| Epoxy resin | e1-1 | 1.5 | 1 | | 1.5 | 1 | 1 | 5.5 |
| | e1-2 | | 1 | 0.5 | | | | |
| | e1-3 | | | 1 | | | | |
| Amine compound | 2-Methylimidazole | 1 | | | 1.2 | 0.7 | 3 | 1 |
| | Triethylenetetramine | | 2 | | | | | |
| | N-Methylpiperzine | | | 1.8 | | | | |
| Solvent | | n-Butanol/ toluene = 1/1 | 2-Propanol/ toluene = 1/2 | 2-Propanol/ toluene/propylene glycol monomethyl ether = 1/1 | n-Butanol/ toluene = 1/1 | n-Butanol/ toluene = 1/1 | n-Butanol/ toluene = 1/1 | n-Butanol/ toluene = 1/1 |
| Concentration of reaction solution | | Resin content: 50% | Resin content: 50% | Resin content: 50% | Resin content: 50% | Resin content: 50% | Resin content: 50% | Resin content: 50% |
| Reaction temperature | | 80° C. | 80° C. | 80° C. | 80° C. | 80° C. | 80° C. | 80° C. |
| Hardener for epoxy resin | Symbol | h-1 | h-2 | h-3 | h-4 | h-5 | h-6 | h-7 |
| | Properties (26° C.) | Solid | Solid | Solid | Solid | Solid | Solid | Solid |
| | Content of low molecular amine compound (B) | 2-Methyl-imidazole 10 ppm or less | Triethylene-tetramine 0.3% by mass | N-Methyl-piperazine 0.8% by mass | 2-Methyl-imidazole 0.4% by mass | 2-Methyl-imidazole 0.5% by mass | 2-Methyl-imidazole 5% by mass | 2-Methyl-imidazole 0.1% by mass | e1-1: Bisphenol A-based epoxy resin (epoxy equivalent: 185 g/equivalent, total chlorine content: 1400 ppm)
e1-2: Bisphenol A-based epoxy resin (epoxy equivalent 470 g/equivalent, total chlorine content: 1300 ppm)
e1-3: Cresol novolac-based epoxy resin (epoxy equivalent: 215 g/equivalent, total chlorine content: 1500 ppm)
*)Amount (equivalent) in the above table means a ratio of the mols of the epoxy group of the epoxy resin and the mols of the amine compound itself.
**)"Resin content" in the above table means a total amount of the epoxy resin and the amine compound.

[Content of Low Molecular Amine Compound (B)]

A chromatogram (HPLC analysis chart) was obtained by high performance liquid chromatography (HPLC). An apparatus used for analysis was "AS-8021", detector: "UV-8020" manufactured by TOSOH. As a column, "Nova-Pak C-18" manufactured by Millipore was used. As a mobile phase, water/acetonitrile of from 70/30 to 0/100 (in a gradient mode) was used. A detection wavelength was 254 nm. By using the solvent for each mixture, a calibration curve for determining the content of the low molecular amine compound (B) was drawn. The content of the low molecular amine compound (B) was determined using such a calibration curve.

Preparation Example 2-1

Into a 2 L three-neck flask equipped with a stirring apparatus and a thermometer, 166 g (1 mol) of tert-butylhydroquinone, 1850 g (20 mol) of epichlorohydrin, 296 g (4 mol) of glycidol, and 0.55 g of tetramethyl ammonium chloride were charged and the resulting mixture was subjected to an addition reaction under heating and refluxing for 2 hours. Then, the resulting mixture was cooled to 60° C., and after a water removal apparatus was attached, 183 g (2.2 mol) of 48.5% sodium hydroxide was added thereto. Water generated was continuously removed azeotropically at a reaction temperature of from 55 to 60° C. under a reduced pressure of from 100 to 150 mmHg, and a ring closure reaction was caused while returning an epichlorohydrin layer, which was one of the distillates, to the reaction system. The time when the amount of the generated water reached 56.5 ml was designated as the reaction end point. Filtration under a reduced pressure and washing with water were then repeated, and residual epichlorohydrin was recovered by further distillation under a reduced pressure to yield a crude epoxy resin.

The resultant crude epoxy resin was subjected to repeated distillation under a reduced pressure to yield a highly soluble epoxy resin G-1. Evaluation results of the highly soluble epoxy resin G-1 thus obtained are shown in Table 3.

Preparation Example 2-2

In a similar manner to Preparation Example 2-1 except for the use of 110 g (1 mol) of resorcin instead of 166 g (1 mol) of tert-butyl hydroquinone, a highly soluble epoxy resin G-2 was obtained. Evaluation results of the highly soluble epoxy resin G-2 thus obtained are shown in Table 3.

Preparation Example 2-3

In a similar manner to Preparation Example 2-1 except that glycidol was not added at the time of the reaction, a highly soluble epoxy resin G-3 was obtained. Evaluation results of the highly soluble epoxy resin G-3 thus obtained are shown in Table 3.

Preparation Example 3-1

In a similar manner to Preparation Example 2-1 except that the amount of 48.5% sodium hydroxide was changed to 158 g (1.9 mol), a highly soluble epoxy resin G-4 was obtained. Evaluation results of the highly soluble epoxy resin G-4 thus obtained are shown in Table 3.

Preparation Example 3-2

In a similar manner to Preparation Example 2-1 except that the amount of 48.5% sodium hydroxide was changed to 173 g (2.1 mol), a highly soluble epoxy resin G-5' was obtained. The resulting highly soluble epoxy resin G-5' was hydrolyzed with an acid to yield a highly soluble epoxy resin G-5. Evaluation results of the highly soluble epoxy resin G-5 thus obtained are shown in Table 3.

TABLE 3

| | Highly soluble epoxy resin (G) | | | | |
|---|---|---|---|---|---|
| | G-1 | G-2 | G-3 | G-4 | G-5 |
| Epoxy equivalent [g] | 155 | 115 | 113 | 122 | 148 |
| Diol-terminated impurity component [% by mass] | 13 | 12 | 3 | 10 | 30 |
| Total chlorine content [ppm] | 670 | 600 | 600 | 12000 | 1900 |
| Hydrolyzable chlorine amount [ppm] | 25 | 18 | 30 | 1100 | 150 |
| Solubility parameter | 8.65 | 8.75 | 8.75 | 8.75 | 8.75 |
| Inter-crosslink molecular weight | 139 | 111 | 111 | 111 | 111 |
| Viscosity [mPa·s] | 750 | 110 | 100 | 120 | 150 |

[Epoxy Equivalent (g)]

The epoxy equivalent is the mass (g) of an epoxy resin containing one equivalent epoxy group, and it was determined in accordance with JIS K-7236.

[Diol-Terminated Impurity Component (% by Mass)]

The epoxy resin was quantitatively analyzed in the following manner. First, a chromatogram (HPLC analysis chart) was obtained by high performance liquid chromatography (HPLC). An apparatus used for analysis was "AS-8021", detector: "UV-8020" manufactured by TOSOH. As a column, "Nova-Pak C-18" manufactured by Millipore was used. As a mobile phase, water/acetonitrile of from 70/30 to 0/100 (in a gradient mode) was used. A detection wavelength of 254 nm was used. A condition for separating the epoxy resin according to a difference in terminal structure was selected, and the separated liquid was collected using a switching valve. Each fraction of the separated liquid thus collected was distilled under a reduced pressure and the residue was analyzed by a mass spectrometer (MS). The MS spectrum exhibited base peaks having a difference in mass number of 18. The base peak having a smaller mass number by 18 was recognized as the basic structural component, while the base peak having a greater mass number by 18 was recognized as the diol-terminated impurity component. An area ratio of the peak intensity of the basic structural component to the peak intensity of the diol-terminated impurity component on the HPLC analysis chart was used for determining the content of the diol-terminated impurity component based on the basic structural component in the epoxy resin.

[Total Chlorine Content (ppm)]

A sample (from 1 to 10 g) was weighed precisely so that a titer was from 3 to 7 ml. The sample was dissolved in 25 ml of ethylene glycol monobutyl ether. To the resulting solution was added 25 ml of a propylene glycol solution of 1N KOH, followed by boiling for 20 minutes. The resulting solution was titrated with an aqueous silver nitrate solution.

[Hydrolyzable Chlorine Content (ppm)]

To 50 ml of toluene was dissolved 3 g of a sample. To the resulting solution was added 20 ml of a methanol solution of 0.1N KOH, followed by boiling for 15 minutes. The resulting solution was titrated with an aqueous silver nitrate solution.

[Solubility Parameter]

The solubility parameter can be determined by substituting parameters, which are shown in Table 1 for structures of the highly soluble epoxy resin whose epoxy group of the fundamental structure has not cleaved, into the above-described equation (1).

[Inter-Crosslink Molecular Weight]

The inter-crosslink molecular weight is a value obtained by dividing the molecular weight of a monomer of the fundamental structural formula of the highly soluble epoxy resin by the number of epoxy groups contained in the fundamental structure formula.

[Viscosity(mPa·s)]

Viscosity was measured using a B type viscometer (Brookfield viscometer as a rotary viscometer) at 25° C.

Preparation Examples 4-1 to 4-5

The hardener for epoxy resin (h-1) in the massive form obtained in Preparation Example 1-1 was crushed, ground and classified under known conditions. First, the hardener was crushed into a size of from approximately 0.1 to 2 mm by using "Rotoplex" (product of Hosokawa Micron). Then the resulting crushed product was fed to an air jet mill ("CJ25 model", product of Nisshin Engineering) at 5.0 kg/Hr and ground at a grinding pressure of 0.6 MPa·s. The ground product was then classified using an air classifier "Turbo Classifier" (product of Nisshin Engineering). By using an optimum combination of grinding and classifying operations, hardeners (H) for the epoxy resin having various average particle sizes and small-particle-size contents as shown in Table 4 were obtained. When the hardener H-1 for epoxy resin was prepared, 2-methylimidazole was added prior to grinding. It was added by melting 100 parts by mass of the hardener (h-1) for the epoxy resin in the massive form, mixing the resulting molten mass with 0.9 part by mass of 2-methylimidazole uniformly and then cooling the resulting mixture to room temperature.

TABLE 4

| | Hardener (H) for epoxy resin | | | | |
|---|---|---|---|---|---|
| | H-1 | H-2 | H-3 | H-4 | H-5 |
| Raw material | Hardener (h-1) for epoxy resin in the massive form | | | | |
| Average particle size (μm) | 1.2 | 5.1 | 3.2 | 1.1 | 14.0 |
| Small-particle-size content (%) | 5% | 9% | 13% | 21% | 8% |

[Average Particle Size (μm), Small-Particle-Size Content (%)]

A sample (4 mg) was added to 32 g of a cyclohexane solution of a surfactant ("Aerosol OT-75", product of Mitsui Cytec) (concentration of surfactant: 1% by mass). The resulting mixture was subjected to ultrasonic exposure for 5 minutes in an ultrasonic washer ("Model W-211", product of Honda Electronics). The water temperature in the ultrasonic washer was adjusted to 19±2° C. A portion of the dispersion thus obtained was taken out and analyzed by a particle size analyzer ("HORIBA LA-920", product of HORIBA) for average particle size and particle size distribution (measurement of small-particle-size content).

Examples 1 to 4, Comparative Examples 1-2

Masterbatch type hardeners for epoxy resin were prepared in accordance with the compositions shown in Table 5 by using the hardeners (H) for the epoxy resins shown in Table 4. Evaluation results of the master batch type hardener for epoxy resin are also shown in Table 5. The evaluation method not particularly specified here was similar to that described in the above Preparation Examples.

TABLE 5

| | | Examples | | | | Comp. Ex. | |
|---|---|---|---|---|---|---|---|
| Composition (parts by mass) | | 1 | 2 | 3 | 4 | 1 | 2 |
| Hardener (H) for epoxy resin | H-1 | 100 | 100 | | | | |
| | H-2 | | | 100 | | | |
| | H-3 | | | | 100 | | |
| | H-4 | | | | | 100 | |
| | H-5 | | | | | | 100 |
| Epoxy resin (e3-1) | | 200 | 200 | 200 | 200 | 200 | 200 |
| Isocyanate compound | MR200 | 8 | 8 | | | 200 | 200 |
| | TDI | | | 6 | | | |
| | MDI | | | | 5 | | |
| Water (active hydrogen compound) | | 0.5 | 0.5 | 1 | 1 | 0.5 | 1.5 |
| Cyclic borate ester compound | | — | 1 | — | — | — | — |
| Shell forming conditions | | 40° C. 3 hours + 50° C. 20 hours | 40° C. 3 hours + 40° C. 24 hours | 40° C. 3 hours + 40° C. 40 hours | 40° C. 3 hours + 50° C. 20 hours | 40° C. 3 hours + 50° C. 20 hours | 40° C. 3 hours + 50° C. 20 hours |
| Presence or absence of binding groups (x), (y), and (z) | | Present | — | — | — | — | — |
| Evaluation | Long-term storage stability | A | B | A | B | D | B |
| | Hardening property | A | A | A | A | A | C |
| | Solvent resistance | B | B | A | B | D | C |

Epoxy resin (e3-1): Bisphenol A-based liquid epoxy resin (epoxy equivalent: 175 g/equivalent, diol-terminated impurity component: 8% by mass, total chlorine content: 1200 ppm)
MR-200: Polymethylene phenylene polyisocyanate, product of Nippon Polyurethane
TDI: Tolylene diisocyanate
MDI: 4,4'-Diphenylmethane diisocyanate
Cyclic borate ester compound: 2,2'-Oxybis(5,5'-dimethyl-1,3,2-oxaborinane)

[Presence or Absence of Binding Groups (x), (y), and (z)]

After repeating washing and filtration of the masterbatch-based hardener composition for the epoxy resin with xylene until the disappearance of the epoxy resin, washing and filtration were repeated with cyclohexane until the disappearance of xylene. The residue was then vacuum dried at 40° C. to determine the mass of the residue (separation of the microcapsule-based hardener for the epoxy resin). Washing and filtration of the microcapsule-based hardener for the epoxy resin were repeated further with methanol until the disappearance of the hardener for epoxy resin, followed by complete removal of methanol by drying at a temperature not greater than 50° C. (separation of the capsule membrane from the microcapsule-based hardener for epoxy resin). The capsule membrane thus separated was vacuum dried at 40° C. and 3 g of the capsule membrane sample was ground in an agate mortar. Then, 2 mg of the ground product and 50 mg of potassium bromide (KBr) powder were ground and mixed. A tableting machine was used to manufacture tablets for FT-IR measurement from the resulting mixture. Using the tablets, an infrared spectrum was obtained using "FT/IR-410" manufactured by JASCO. By comparing the spectrum chart thus obtained and standard IR spectral line, the presence of binding groups (x), (y) and (z) in the capsule membrane was confirmed.

The standard IR spectral line was obtained in the following manner. A model compound (M1) having a binding group (x) with an absorption band of from 1630 to 1680 cm$^{-1}$ but having neither a binding group (y) or (z), a model compound (M2) having a binding group (y) with an absorption band of from 1680 to 1725 cm$^{-1}$ but having neither a binding group (x) or (z), and a model compound (M3) having a binding group (z) with an absorption band of from 1730 to 1755 cm$^{-1}$ but having neither a binding group (x) or (y) as disclosed in Patent Document 1 were prepared. A mixture obtained by mixing the model compounds (M1), (M2), and (M3) at a desired ratio while weighing them precisely and KBr powder were ground together and the resulting ground product was tableted using a tableting machine into calibration sample tablets for FT-IR measurement. Standard IR spectra of the binding groups (x), (y) and (z) could be formed based on the spectrum of the model compound (M1) at an absorption band from 1630 to 1680 cm$^{-1}$ and also the actually measured spectra of the model compounds (M2) and (M3). For measurement, "FT/IR-410" manufactured by JASCO was used.

[Long-Term Storage Stability]

Viscosities before and after the masterbatch-based hardener for the epoxy resin was stored at 40° C. for 2 weeks were measured and long-term storage stability was evaluated in accordance with a viscosity increase ratio. When the viscosity after storage increased to 10 times or more of the viscosity before storage or gelation occurred, the hardener was rated D; when the viscosity after storage increased to 5 times or more but not less than 10-times, the hardener was rated C; when the viscosity after storage increased to 2 times or more but not less than 5 times, the hardener was rated B; and when the viscosity after storage increased to less than 2 times, the hardener was rated A. The viscosity is measured at 25° C. using a BM viscometer.

[Hardening Property (Reaction Rapidity-1)]

First, 30 parts of the masterbatch-based hardener for epoxy resin was mixed with 100 parts of a bisphenol A-based epoxy resin (epoxy equivalent: 189 g/equivalent, total chlorine content: 1200 ppm, which will hereinafter be called "epoxy resin (e4)") to prepare a one-part epoxy resin composition.

A viscosity-temperature curve of the one-part liquid composition was obtained at a temperature elevation rate of 5° C./min by using a rheometer ("Rheo Stress 5600") manufactured by Thermo ELECTRON CORPORATION. A viscosity at 40° C., and a starting temperature of hardening with a viscosity increase ratio of 20%/min or greater and a viscosity at the starting temperature are measured.

The viscosities are compared between at 40° C. and at the hardening starting temperature. When a viscosity change ratio was less than 5% and the hardening starting temperature was 130° C. or less, the hardener was rated as A; when a viscosity increase ratio was 5% or greater but less than 20% and the hardening starting temperature was 130° C. or less, the hardener was rated B; when a viscosity increase ratio was 5% or greater but less than 20% and the hardening starting temperature exceeded 130° C. but not greater than 150° C. was rated C; and when a viscosity increase ratio was 20% or greater, the hardener was rated D.

[Solvent Resistance]

First, 30 parts of the masterbatch-based hardener for the epoxy resin was mixed with 100 parts of the epoxy resin (e4) to prepare a one-part epoxy resin composition.

The resulting one-part epoxy resin composition was mixed with a 1:1 (mass ratio) solvent mixture of ethyl acetate and toluene to give a nonvolatile content of 70%. Two samples were prepared from the resulting mixture by allowing it to stand at 25° C. for one hour and allowing it to stand at 40° C. for one hour. The solvent resistance was evaluated by measuring the time until gelation by using a gelation tester in the following manner in accordance with JIS C-6521. Described specifically, 0.4 ml of a sample was placed on a gel plate maintained at 120° C. Then, the sample was stirred with a stirring rod and time until threading stopped, in other words, time (second) until gelation was measured. As the sample, the above-described samples (mixture with the solvent mixture) were used and a difference in time until gelation between the sample allowed to stand at 25° C. for 1 hour and the sample allowed to stand at 40° C. for 1 hour was found. In the case of the one-part epoxy resin composition having higher solvent resistance against the solvent mixture, a difference in time until gelation was smaller between the sample allowed to stand at 25° C. for 1 hour and the sample allowed to stand at 40° C. for 1 hour. In the case of the composition having poor solvent resistance, time until gelation was shorter in the sample allowed to stand at 40° C. than the sample allowed to stand at 25° C. When a difference in time until gelation was less than 10%, the composition was rated A, when a difference was 10% or greater but less than 20%, the composition was rated B, when a difference was 20% or greater but less than 40%, the composition was rated C, when a difference was 40% or greater, the composition was rated D, and when the one-part epoxy resin composition gelled after allowed to stand at 40° C. for one hour, it was rated E.

The results shown in Table 5 have revealed that:

(1) the microcapsule-based hardener for the epoxy resin obtained using, as a starting material, the hardener (H) for the epoxy resin having an average particle size and a small-size-particle content set to fall within predetermined ranges and covering the hardener with a specific shell (S) can provide hardener compositions for epoxy resin having a hardening property with excellent reaction rapidity, and high long-term storage stability and high solvent resistance; and (2) a large amount of an active hydrogen compound as a shell (S) forming material and a greater average particle size contribute to improvement of solvent resistance.

Preparation Examples 5-1 to 5-6

Hardeners H-6 to H-11 for the epoxy resin were obtained by subjecting the raw materials shown in Table 6 to known crushing, grinding and classification treatments. When the hardener H-6 for epoxy resin was prepared, 2-methylimidazole was added prior to grinding. For the addition, employed was a process of melting 100 parts by mass of the hardener (h-1) for the epoxy resin in the massive form, uniformly mixing the molten hardener with 0.9 part by mass of 2-methylimidazole, and then cooling the resulting mixture to room temperature. The properties and average particle size of the hardeners H-6 to H-11 for the epoxy resin thus obtained are also shown in Table 6. The evaluation method not particularly specified here was similar to that described in the above Preparation Examples, Examples or Comparative Examples.

TABLE 6

| | | Hardener (H) for epoxy resin | | | | | |
|---|---|---|---|---|---|---|---|
| | | H-6 | H-7 | H-8 | H-9 | H-10 | H-11 |
| Raw materials | Hardener for epoxy resin in the massive form | h-1 | h-2 | h-3 | h-4 | h-5 | h-6 |
| | Note (content of low molecular amine compound (B)) | 2-Methylimidazole: 10 ppm or less | Triethylenetetramine: 0.3% by mass | N-methylpiperazine: 0.8% by mass | N-methylimidazole: 0.4% by mass | 2-Methylimidazole: 0.5% by mass | 2-Methylimidazole: 5% by mass |
| | Average particle size (μm) | 2.5 | 2.0 | 1.9 | 1.4 | 1.0 | 2.5 |
| | Properties (25° C.) | Solid | — | — | — | — | — |

Examples 5 to 7, Comparative Examples 3 to 5

The masterbatch-based hardeners for the epoxy resin having the composition as shown in Table 7 were obtained using the hardeners (H) for epoxy resin shown in Table 6. Evaluation results of the resulting masterbatch-based hardeners for the epoxy resin are also shown in Table 7. The evaluation method not particularly specified here was similar to that described in the above Preparation Examples, Examples or Comparative Examples.

TABLE 7

| | | Examples | | | Comparative Examples | | |
|---|---|---|---|---|---|---|---|
| Composition (parts by mass) | | 5 | 6 | 7 | 3 | 4 | 5 |
| Hardener (H) for epoxy resin | H-6 | 100 | | | | | |
| | H-7 | | 100 | | | | |
| | H-8 | | | 100 | | | |
| | H-9 | | | | 100 | | |
| | H-10 | | | | | 50 | |
| | H-11 | | | | | | 50 |
| Epoxy resin (e3-2) | | 200 | 200 | 200 | 200 | 200 | 200 |
| Isocyanate compound | MR200 | 8 | 10 | | 3 | | 7 |
| | TDI | | | | | 28 | |
| | MDI | | | 4 | | | |
| Active hydrogen compound | Water | 0.5 | 2 | 0.5 | 0.5 | 1 | |
| | Diol-400 | | | | | | 1 |
| Cyclic borate ester compound | | 0 | 0 | 0.3 | 0 | 0 | 0 |
| Shell forming conditions | | 40° C. 3 hours + 50° C. 8 hours | 40° C. 3 hours + 50° C. 8 hours | 40° C. 3 hours + 50° C. 8 hours | 40° C. 3 hours + 50° C. 8 hours | 40° C. 3 hours + 50° C. 8 hours | 40° C. 3 hours + 50° C. 8 hours |
| Shell | Presence or absence of binding groups (x), (y), and (z) | Present | Present | Present | Present | Present | Present |
| | Presence or absence of carboxylate bond | Absent | Absent | Absent | Absent | Absent | Present |
| | Shell thickness ratio | 100:3.8 | 100:4.5 | 100:2.5 | 100:1.2 | 100:2.5 | 100:3.3 |
| Evaluation | Total chlorine content (ppm) | 1200 | 1300 | 1500 | 1100 | 1800 | 1200 |
| | Storage stability | B | A | B | C | C | C |
| | reaction rapidity -2 | B | B | B | C | D | B |
| | Storage stability when humidified | B | B | B | C | C | D |

Epoxy resin (e3-2): Bisphenol A-based liquid epoxy resin (epoxy equivalent: 175 g/equivalent, diol-terminated impurity component: 8% by mass, total chlorine content: 1100 ppm)
MR-200: Polymethylene phenylene polyisocyanate, product of Nippon Polyurethane
TDI: Tolylene diisocyanate
MDI: 4,4'-Diphenylmethane diisocyanate
Diol-400: Polyester-based polyol manufactured by Mitsui Takeda Chemicals
Cyclic borate ester compound: 2,2'-Oxybis(5,5'-dimethyl-1,3,2-oxaborinane)

[Presence or Absence of Carboxylate Bond]

As a measuring apparatus of a nuclear magnetic resonance spectrum, "DSX400" (magnetic field: 400 MHz) manufactured by Bruker was used. Measurement was performed under the following conditions: use of 13C as a nuclide to be observed, pulse program of CPSELTICS, pulse conditions (pulse repetition time of 5 seconds, proton 90 DEG pulse of 5.2 μs, contact time; 1 mmsec), and magic angle spinning of 5000 Hz. With C13 nuclear magnetic resonance spectrum of a methyl methacrylate polymer as a synthesized model, the masterbatch-based hardener composition for the epoxy resin was judged that it had no carbonyl carbon derived from a carboxylate group (meaning that carboxylate bond was absent) when a ratio of a peak height due to carbonyl carbon of an ester group appearing from 165 to 175 ppm and a peak height of a methylene chain appearing from 28 to 28 ppm was not greater than one tenth of that of the model compound.

[Shell Thickness Ratio]

The masterbatch-based hardener composition for the epoxy resin was hardened using a modified aliphatic amine hardener while maintaining the microcapsule at 40° C. over 12 hours. Then the resulting composition was hardened completely at 120° C. over 24 hours. The hardened product was cut into an ultrathin sample by using a cryo ultramicrotome and thickness of the shell of the microcapsule-based hardener in the epoxy resin was observed and measured by observation under a transmission electron microscope (TEM). The thickness was converted into a ratio of the thickness of the shell to the average particle size of the hardener (H) for the epoxy resin, a starting material of the core, set at 100.

[Total Chlorine Content (ppm)]

The masterbatch-based hardener composition for the epoxy resin was washed and filtered repeatedly with xylene until the disappearance of the epoxy resin. The filtrate was distilled under a reduced pressure at 100° C. or less to obtain an epoxy resin. The epoxy resin sample (from 1 to 10 g) thus obtained was weighed precisely so that a titer became from 3 to 7 ml. The sample was then dissolved in 25 ml of ethylene glycol monobutyl ether. To the resulting solution was added 25 ml of a propylene glycol solution of 1N KOH. After boiling for 20 minutes, the resulting mixture was titrated with an aqueous solution of silver nitrate.

[Storage Stability]

Viscosities before and after the masterbatch-based hardener for the epoxy resin was stored at 40° C. for 1 week were measured and the storage stability was evaluated using a viscosity increase ratio. When the viscosity after storage increased to 10 times or more of the viscosity before storage or gelation occurred, the hardener was rated D; when the viscosity after storage increased to 5 times or more but less than 10 times, the hardener was rated C; when the viscosity after storage increased to 2 times or more but less than 5 times, the hardener was rated B; and when the viscosity after storage increased to less than 2 times, the hardener was rated A. The viscosity was measured at 25° C. using a BM viscometer.

[Reaction Rapidity −2]

A viscosity-temperature curve of the masterbatch-based hardener composition for the epoxy resin was obtained by measuring the viscosity every 5° C. from 40° C. using a rheometer ("Rheo Stress 5600") manufactured by Thermo ELECTRON CORPORATION, while elevating temperature at a rate of 5° C./min. From the viscosity-temperature curve, a viscosity increase ratio Δρ (%) at each temperature T (° C.) was determined in accordance with the following equation and a temperature T satisfying Δρ≧100% was designated as a hardening starting temperature (Th) (° C.).

$$\Delta\rho = ((\rho T - (\rho T+5))/\rho T) \times 100$$

wherein ρT represents a viscosity (mPa·s) at T (° C.) and (ρT+5) represents a viscosity (mPa·s) at T+5° C.

The viscosity change ratio (R) was then determined from the following equation:

$$R = (\rho Th/\rho 40) \times 100$$

wherein ρTh represents a viscosity (mPa·s) at Th (° C.) and ρ40 represents a viscosity (mPa·s) at 40° C.

Based on the hardening starting temperature (Th) and the viscosity change ratio (R) thus determined, the reaction rapidity was evaluated in accordance with the following classification.

(A) When R<300%,
 Th<130° C.: A
 130° C.≦Th<150° C.: B
 150° C.≦Th<180° C.: C
(B) When 300%≦R<1000%,
 Th<130° C.: C
 130° C.≦Th<150° C.: D
 150° C.≦Th<180° C.: E
(C) When 1000%≦R or 180° C.≦Th: F

[Storage Stability when Humidified]

Viscosities of the masterbatch-based hardener for the epoxy resin were measured before and after it was maintained for 6 hours at constant temperature of 30° C. and constant humidity of 85% and then stored at 40° C. for one week. The hardener was evaluated by a viscosity increase ratio. When the viscosity of the hardener after storage increased to 10 times or more of the viscosity before storage or gelation occurred, the hardener was rated D; when the viscosity after storage increased to 5 times or more but less than 10 times, the hardener was rated C; when the viscosity after storage increased to 2 times or more but less than 5 times, the hardener was rated B; and when the viscosity after storage increased to less than 2 times, the hardener was rated A. The viscosity was measured at 25° C. using a BM viscometer.

The results shown in Table 7 have revealed that:

(1) the microcapsule-based hardener for the epoxy resin obtained using, as a starting material, the hardener (H) for the epoxy resin having an average particle size set to fall within a predetermined range and covering the hardener with a specific shell (S) having a specific thickness ratio can provide a hardener composition for epoxy resin having a hardening property with excellent reaction rapidity, and high storage stability and high storage stability when humidified.

Preparation Examples 6-1 to 6-7

Hardeners H-12 to H-18 for the epoxy resin were obtained by subjecting the raw materials shown in Table 8 to known crushing, grinding and classification treatments. When the hardener H-12 for the epoxy resin was prepared, 2-methylimidazole was added prior to grinding. For the addition, employed was a process of melting 100 parts by mass of the hardener (h-1) for the epoxy resin in the massive form, uniformly mixing the molten hardener with 0.9 parts by mass of 2-methylimidazole, and then cooling the resulting mixture to room temperature. The properties of the hardeners H-12 to H-18 for the epoxy resin thus obtained are also shown in Table 8. The evaluation method not particularly specified here was similar to that described in the above Preparation Examples, Examples or Comparative Examples.

TABLE 8

| | | Hardener (H) for epoxy resin | | | | | | |
|---|---|---|---|---|---|---|---|---|
| | | H-12 | H-13 | H-14 | H-15 | H-16 | H-17 | H-18 |
| Raw materials | Hardener for epoxy resin in the massive form | h-1 | h-2 | h-3 | h-4 | h-5 | h-6 | h-7 |
| | Note (content of low molecular amine compound (B)) | 2-Methylimidazole 10 ppm or less | Triethylene-tetramine 0.3% by mass | N-Methyl-piperazine 0.8% by mass | 2-Methyl-imidazole 0.4% by mass | 2-Methyl-imidazole 0.5% by mass | 2-Methyl-imidazole 5% by mass | 2-Methyl-imidazole 0.1% by mass |
| Average particle size (μm) | | 2.2 | 3.8 | 5.5 | 2.5 | 1.8 | 10.5 | 1.2 |
| Small particle size content (%) | | 13 | 11 | 14 | 8 | 12 | 4 | 14 |
| Specific surface area (m$^2$/g) | | 4.5 | 3.7 | 3.2 | 4.2 | 7.5 | 0.9 | 31.5 |
| Properties (25° C.) | | Solid | Solid | Solid | Solid | Solid | Solid | Solid |

[Specific Surface Area]

The specific surface area of the hardener for the epoxy resin was measured with an automatic BET surface analyzer "HM model-1201" manufactured by Mountech while using a 30:70 (volume ratio) nitrogen gas:helium gas mixture as an adsorption gas.

Examples 8 to 12, Comparative Examples 6 to 8

The masterbatch-based hardeners for the epoxy resin having the compositions shown in Table 9 were prepared using the hardeners (H) for the epoxy resin shown in Table 8. Evaluation results of the masterbatch-based hardeners for the epoxy resin thus obtained are also shown in Table 9. The evaluation method not particularly specified here was similar to that described in the above Preparation Examples, Examples or Comparative Examples.

TABLE 9

| | | Examples | | | | | Comparative Examples | | |
|---|---|---|---|---|---|---|---|---|---|
| Composition (parts by mass) | | 8 | 9 | 10 | 11 | 12 | 6 | 7 | 8 |
| Hardener (H) for epoxy resin | H-12 | 100 | | | | | | | |
| | H-13 | | 100 | | | | | | |
| | H-14 | | | 100 | | | | | |
| | H-15 | | | | 100 | | | | |
| | H-16 | | | | | 100 | | | |
| | H-17 | | | | | | 100 | | |
| | H-18 | | | | | | | 100 | 100 |
| Epoxy resin (e3-1) | | 200 | 200 | 200 | 200 | 200 | 200 | 200 | 200 |
| Isocyanate compound | MR200 | 5 | 5 | | 7 | | 7 | | |
| | TDI | | | | | 9 | | | |
| | MDI | | | 5 | | | | 12 | 12 |
| Active hydrogen compound | Water | 0.5 | 1.5 | 1 | 1 | 1 | 0.5 | 1 | |
| | Diol-400 | | | | | | | | 1 |
| Shell forming conditions | | 40° C. 3 hours + 50° C. 8 hours | 40° C. 3 hours + 40° C. 24 hours | 40° C. 3 hours + 40° C. 40 hours | 40° C. 3 hours + 50° C. 20 hours | 40° C. 3 hours + 50° C. 20 hours | 40° C. 3 hours + 50° C. 8 hours | 40° C. 3 hours + 50° C. 8 hours | 40° C. 3 hours + 50° C. 8 hours |
| Shell | Presence of binding group (x), (y), and (z) | Presence | Presence | Presence | Presence | Presence | Presence | Presence | Presence |
| | Presence of carboxylate bond | Absence | Absence | Absence | Absence | Absence | Absence | Absence | Presence |
| Evaluation | Total chlorine content (ppm) | 1500 | 1400 | 1100 | 1300 | 1200 | 1300 | 1400 | 1400 |
| | Storage stability | B | A | A | B | B | C | C | D |
| | Solvent resistance | A | B | A | B | B | C | E | D |
| | reaction rapidity -3 | A | A | A | A | A | C | B | D |
| | Storage stability when humidified | B | B | B | B | B | C | C | D |

Epoxy resin (e3-1): Bisphenol A-based liquid epoxy resin (epoxy equivalent: 175 g/equivalent, diol-terminated impurity component: 8% by mass, total chlorine content: 1400 ppm)
MR-200: Polymethylene phenylene polyisocyanate, product of Nippon Polyurethane
TDI: Tolylene diisocyanate
MDI: 4,4'-Diphenylmethane diisocyanate
Diol-400: Polyester type polyol manufactured by Mitsui Takeda Chemicals

[Reaction Rapidity-3]

A viscosity-temperature curve of the masterbatch-based hardener for epoxy resin was obtained at a temperature elevation rate of 5° C./min by using a rheometer ("Rheo Stress 5600") manufactured by Thermo ELECTRON CORPORATION. A viscosity measured at 40° C., and a starting temperature of hardening with a viscosity increase ratio of 20%/min or greater and a viscosity at the starting temperature were measured. The viscosity (A) measured at 40° C. was compared with the viscosity (B) measured at the hardening starting temperature and a viscosity change ratio was determined based on the following equation:

Viscosity change ratio (%)=((A−B)/A)*100

When the viscosity increase ratio was less than 300% and the hardening starting temperature was 130° C. or less, the hardener was rated as A; when the viscosity increase ratio was 300% or greater but not greater than 1000% and the hardening starting temperature was 130° C. or less, the hardener was rated B; when the viscosity increase ratio was 300% or greater but not greater than 1000% and the hardening starting temperature exceeded 130° C. but not greater than 170° C. was rated C; and when the viscosity increase ratio was 1000% or greater, the hardener was rated D.

The results shown in Table 9 have revealed that:

(1) the microcapsule-based hardener for the epoxy resin obtained using, as a starting material, the hardener (H) for the epoxy resin having an average particle size and a specific surface area set to fall within predetermined ranges and covering the hardener with a specific shell (S) can provide hardener compositions for the epoxy resin exhibiting excellent reaction rapidity, and high storage stability, solvent resistance, and storage stability when humidified.

Examples 13 to 15, Comparative Examples 9 to 10

The hardener (h-1) for the epoxy resin in the massive form obtained in Example 1-1 was ground under known conditions and a hardener H-19 for epoxy resin having a softening point of 97° C. and an average particle size of 2.5 μm was obtained. The softening point was measured in accordance with JIS K-7234 (ring-and-ball method).

The masterbatch-based hardeners for the epoxy resin having the compositions shown in Table 10 were prepared using the hardener (H-19) for the epoxy resin. Evaluation results of the masterbatch-based hardeners for the epoxy resin thus obtained are also shown in Table 10. The evaluation method not particularly specified here was similar to that described in the above Preparation Examples, Examples or Comparative Examples.

| | | Examples | | | Comparative Examples | |
|---|---|---|---|---|---|---|
| Composition (parts by mass) | | 13 | 14 | 15 | 9 | 10 |
| Hardener (H) for epoxy resin | H-19 | 100 | 100 | 100 | 100 | 100 |
| Epoxy resin (e3-3) | | 160 | 160 | 160 | 160 | 160 |
| Isocyanate compound | MR200 | | 6 | | 7 | 7 |
| | TDI | 8 | | | | |
| | MDI | | | 8 | | |
| Active hydrogen compound | Water | 1.5 | 1.5 | 1 | 0.5 | 0.5 |
| Shell forming conditions | | Room Tmp 3 hours + 50° C. 8 hours | 40° C. 3 hours + 50° C. 24 hours | 40° C. 3 hours + 50° C. 24 hours | 40° C. 3 hours + 50° C. 8 hours | 40° C. 3 hours + 50° C. 8 hours |
| Highly soluble epoxy resin | G-1 | 50 | | | | |
| | G-2 | | 50 | | | |
| | G-3 | | | 50 | | |
| | G-4 | | | | 50 | |
| | G-5 | | | | | 50 |
| Shell | Presence or absence of binding groups (x), (y), and (z) | Present | Present | Present | Present | Present |
| Evaluation | Total chlorine content (ppm) | 700 | 680 | 680 | 2600 | 1400 |
| | Storage stability | B | B | B | C | B |
| | Reaction rapidity -3 | A | A | A | C | C |
| | Water resistance of hardened product | A | A | A | B | C |
| | Solvent resistance | A | B | A | C | B |
| | Hardening property | A | A | A | B | B |

H19: average particle size: 2.5 μm, softening point: 97° C., content of low molecular amine compound (2-methylimidazole): 0.9% by mass
Epoxy resin (e3-3): Bisphenol F-based liquid epoxy resin (SP: 9040, inter-crosslink molecular weight: 156, total chlorine content: 300 ppm)
MDI: 4,4'-Diphenylmethane diisocyanate

[Water Resistance of Hardened Product]

A one-part epoxy resin composition was prepared by mixing 30 parts of a masterbatch-based hardener (F) for the epoxy resin with 100 parts of epoxy resin (e4). The resulting one-part epoxy resin composition was mixed with a 1:1 (mass ratio) solvent mixture of ethyl acetate and toluene so that the nonvolatile content was 70%. The resulting mixture was allowed to stand at 25° C. for 1 hour. The resulting reaction mixture was applied to give a dry film thickness of 50 μm, followed by heating and drying at 70° C. for 5 minutes to remove the solvent from the composition. A film sample made of the one-part epoxy resin composition was thus prepared. The resulting film sample was sandwiched between stainless plates (grade of the stainless plate: SUS 304) having a thickness of 1.2 mm and they were thermocompression bonded for 20 seconds at 30 kg/cm² on a hot plate of 200° C.

The tensile shear bond strength was measured before and after the resulting plate was maintained at a temperature of 85° C. and a humidity of 85% for 8 hours. When a reduction in bond strength was within 25%, the composition was rated A, while when a reduction was 25% or greater, the composition was rated B.

Preparation Examples 7-1 to 7-4

Hardeners H-20 to H-23 for the epoxy resin were prepared by subjecting the raw materials shown in Table 11 to known crushing, grinding and classification treatments. When the hardener H-20 for the epoxy resin was prepared, 2-methylimidazole was added prior to grinding. For the addition, employed was a process of melting 100 parts by mass of the hardener (h-1) for the epoxy resin in the massive form, uniformly mixing the molten hardener with 0.9 part by mass of 2-methylimidazole, and then cooling the resulting mixture to room temperature. The properties of the hardeners H-20 to H-23 for the epoxy resin thus obtained are also shown in Table 11. The evaluation method not particularly specified here was similar to that described in the above Preparation Examples, Examples or Comparative Examples.

TABLE 11

| | | Hardener (H) for epoxy resin | | | |
|---|---|---|---|---|---|
| | | H-20 | H-21 | H-22 | H-23 |
| Raw materials | Hardener for epoxy resin in the massive form | h-1 | h-5 | h-6 | h-7 |
| | Note: (content of low molecular amine compound (B)) | 2-Methyl-imidazole: 10 ppm or less | 2-Methyl-imidazole: 0.5% by mass | 2-Methyl-imidazole: 5% by mass | 2-Methyl-imidazole: 0.1% by mass |
| Average particle size (μm) | | 1.1 | 2.5 | 10.5 | 1.2 |
| Small-particle-size content (%) | | 21 | 14 | 4 | 14 |
| Specific surface area (m$^2$/g) | | 28.4 | 4.3 | 0.9 | 31.0 |
| Properties (25° C.) | | Solid | Solid | Solid | Solid |

Examples 16 to 24, Comparative Examples 11 to 16

Masterbatch-based hardeners for the epoxy resin were prepared by mixing the hardener (H) for the epoxy resin, the epoxy resin (e3-1 to e3-2), the isocyanate compound, and the active hydrogen compound in accordance with the composition shown in Table 12 or 13, reacting the resulting mixture under shell forming conditions shown in Table 12 or 13, then adding the highly soluble epoxy resin (the epoxy resin prepared in Preparation Examples 2-1 to 2-3, and 3-1 to 3-2). Evaluation results of the masterbatch-based hardeners for the epoxy resin thus obtained are also shown in Tables 12 and 13. The evaluation method not particularly specified here was similar to that described in the above Preparation Examples, Examples or Comparative Examples.

TABLE 12

| | | | Examples | | | | | | | | |
|---|---|---|---|---|---|---|---|---|---|---|---|
| Composition (parts by mass) | | | 16 | 17 | 18 | 19 | 20 | 21 | 22 | 23 | 24 |
| Hardener (H) for epoxy resin | H-12 | | 100 | 100 | | | | | | | |
| | H-13 | | | | 100 | | | | | | |
| | H-14 | | | | | 100 | | | | | |
| | H-15 | | | | | | 100 | | | | |
| | H-16 | | | | | | | 100 | | | |
| Epoxy resin (e3-1) | | | 200 | | 200 | 200 | 200 | 200 | | | |
| Epoxy resin (e3-2) | | | | 160 | | | | | 160 | 160 | 160 |
| Isocyanate compound | MR200 | | | | | | | | | 10 | |
| | TDI | | 8 | | 8 | 5 | | 7 | 9 | 8 | |
| | MDI | | | | | | 5 | | | | 1.1 |
| Active hydrogen compound | Water | | 1.5 | 1.5 | 1.5 | 1 | 1 | 1 | 1.5 | 1.5 | 1 |
| Cyclic borate ester compound | | | — | — | 0.3 | — | — | — | 0.3 | 0.5 | — |
| Shell forming conditions | | | 40° C. 3 hours + 50° C. 8 hours | 40° C. 3 hours + 50° C. 8 hours | 40° C. 3 hours + 50° C. 24 hours | 40° C. 3 hours + 50° C. 24 hours | 40° C. 3 hours + 50° C. 20 hours | 40° C. 3 hours + 50° C. 20 hours | 40° C. 3 hours + 50° C. 8 hours | 40° C. 3 hours + 50° C. 24 hours | 40° C. 3 hours + 50° C. 20 hours |
| Highly soluble epoxy resin | G-1 | | | 50 | | | | | 50 | | |
| | G-2 | | | | | | | | | 50 | |
| | G-3 | | | | | | | | | | 50 |
| Shell | Presence or absence of binding groups (x), (y) and (z) | | Presence | Presence | Presence | Presence | Presence | Presence | Presence | Presence | Presence |

TABLE 12-continued

|  | Composition (parts by mass) | Examples | | | | | | | | |
|---|---|---|---|---|---|---|---|---|---|---|
|  |  | 16 | 17 | 18 | 19 | 20 | 21 | 22 | 23 | 24 |
|  | Presence or absence of carboxylate bond | Absence | Absence | Absence | Absence | Absence | Absence | Absence | Absence | Absence |
|  | Shell thickness ratio | 100:8.8 | 100:9.5 | 100:4.5 | 100:5.6 | 100:7.5 | 100:11.0 | 100:8.0 | 100:13.5 | 100:10.9 |
| Evaluation | Total chlorine content (ppm) | 1500 | 750 | 1400 | 1100 | 1300 | 1200 | 700 | 680 | 680 |
|  | Storage stability | B | A | B | B | B | A | A | A | A |
|  | reaction rapidity -2 | B | A | B | A | B | B | A | A | A |
|  | reaction rapidity -3 | B | A | B | A | B | B | A | A | A |
|  | Storage stability when humidified | B | B | B | B | B | B | B | B | B |
|  | Solvent resistance | A | A | B | A | B | A | A | B | A |
|  | Hardening property | A | A | B | A | B | B | B | B | B |
|  | Water resistance of hardened product | A | A | A | A | A | A | A | A | A |

Epoxy resin (e3-1): Bisphenol A-based liquid epoxy resin (epoxy equivalent: 175 g/equivalent, diol-terminated impurity component: 8% by mass, total chlorine content: 1400 ppm)
Epoxy resin (e3-2): Bisphenol A-based liquid epoxy resin (epoxy equivalent: 175 g/equivalent, diol-terminated impurity component: 8% by mass, total chlorine content: 1100 ppm)
Cyclic borate ester compound: 2,2'-oxybis(5,5'-dimethyl-1,3,2-oxaborinane)
MR-200: Polymethylene phenylene polyisocyanate, product of Nippon Polyurethane
TDI: Tolylene diisocyanate
MDI: 4,4'-Diphenylmethane diisocyanate
Diol-400: Polyester type polyol manufactured by Mitsui Takeda Chemicals

TABLE 13

|  | Composition (parts by mass) |  | Comparative Examples | | | | | |
|---|---|---|---|---|---|---|---|---|
|  |  |  | 11 | 12 | 13 | 14 | 15 | 16 |
| Hardener (H) for epoxy resin | H-20 |  | 100 |  |  |  |  |  |
|  | H-21 |  |  | 100 |  |  | 100 | 100 |
|  | H-22 |  |  |  | 100 |  |  |  |
|  | H-23 |  |  |  |  | 100 |  |  |
| Epoxy resin (e3-1) |  |  | 200 | 200 | 200 | 200 |  |  |
| Epoxy resin (e3-2) |  |  |  |  |  |  | 160 | 160 |
| Isocyanate compound | MR200 |  | 8 | 7 | 12 |  | 7 | 7 |
|  | TDI |  |  |  |  |  |  |  |
|  | MDI |  |  |  |  | 15 |  |  |
| Active hydrogen compound | Water |  | 1.5 |  | 0.5 | 1 | 0.5 | 0.5 |
|  | Diol-400 |  |  | 1 |  |  |  |  |
| Shell forming conditions |  |  | 40° C. 3 hours + 50° C. 8 hours | 40° C. 3 hours + 50° C. 8 hours | 40° C. 3 hours + 50° C. 8 hours | 40° C. 3 hours + 50° C. 8 hours | 40° C. 3 hours + 50° C. 8 hours | 40° C. 3 hours + 50° C. 8 hours |
| Highly soluble epoxy resin | G-4 |  |  |  |  |  | 50 |  |
|  | G-5 |  |  |  |  |  |  | 50 |
| Shell | Presence or absence of binding groups (x), (y) and (z) |  | Presence | Presence | Presence | Presence | Presence | Presence |
|  | Presence or absence of carboxylate bond |  | Absence | Presence | Absence | Absence | Absence | Absence |
|  | Shell thickness ratio |  | 100:10.0 | 100:3.3 | 100:20 | 100:15 | 100:3.5 | 100:5.6 |
| Evaluation | Total chlorine content (ppm) |  | 1200 | 1200 | 1300 | 1400 | 2600 | 1400 |
|  | Storage stability |  | C | C | D | C | C | B |
|  | reaction rapidity -2 |  | D | D | C | C | C | B |
|  | reaction rapidity -3 |  | B | B | C | B | B | B |
|  | Storage stability when humidified |  | B | D | C | C | C | C |
|  | Solvent resistance |  | C | C | D | C | C | B |
|  | Hardening property |  | B | B | B | B | B | B |
|  | Water resistance of hardened product |  | A | A | A | A | B | C |

Epoxy resin (e3-1): Bisphenol A-based liquid epoxy resin (epoxy equivalent: 175 g/equivalent, diol-terminated impurity component: 8% by mass, total chlorine content: 1400 ppm)
Epoxy resin (e3-2): Bisphenol A-based liquid epoxy resin (epoxy equivalent: 175 g/equivalent, diol-terminated impurity component: 8% by mass, total chlorine content: 1100 ppm)
MR-200: Polymethylene phenylene polyisocyanate manufacture by Nippon Polyurethane
TDI: Tolylene disocyanate
MDI: 4,4'-Diphenylmethane diisocyanate
Diol-400: Polyester type polyol manufactured by Mitsui Takeda Chemicals

Example of Preparation of Conductive Film

A bisphenol A epoxy resin ("AER 2603", product of Asahi Kasei Chemicals) (15 parts by mass), 6 parts by mass of a phenolic novolac resin ("BRG-558", trade name; product of Showa Highpolymer), and 4 parts by mass of a synthetic rubber ("Nipol 1072", trade name; product of Nippon Zeon, weight average molecular weight: 300000) were dissolved in 20 parts by mass of a 1:1 (mass ratio) solvent mixture of methyl ethyl ketone and butyl cellosolve acetate. The resulting solution was mixed with 74 parts by mass of silver powder, followed by kneading in a triple roll mill. To the kneaded mass was added 30 parts by mass of the masterbatch hardener for the epoxy resin obtained in Example 16. The resulting mixture was mixed uniformly to yield a conductive adhesive. The resulting conductive adhesive was cast on a polypropylene film having a thickness of 40 µm and half-hardened by drying at 80° C. for 60 minutes to obtain a conductive film having a conductive adhesive layer of 35 µm thick. By using the resulting conductive film, the conductive adhesive layer was transferred to the back surface side of a silicon wafer on a heat block of 80° C. The silicon wafer was then full diced. The semiconductor chip with the conductive adhesive was then bonded onto a lead frame and hardened on a heat block under conditions of 200° C. for 2 minutes. The chip thus obtained had no problem in its conductivity.

Example of Preparation of Conductive Paste

To 100 parts by mass of the epoxy resin (e4) were added 30 parts by mass of the masterbatch-based hardener composition for the epoxy resin obtained in Example 16, 150 parts by mass of silver flake powder having an average particle size of 14 µm and an aspect ratio of 11 (product of Tokuriki Chemical Research), and 60 parts by mass of nickel flake powder having an average particle size of 10 µm and an aspect ratio of 9 ("NI110104", trade name; product of Kojundo Chemical Laboratory). After the resulting mixture was stirred until it became uniform, it was uniformly dispersed in a triple roll mill to yield a conductive paste. The resulting conductive paste was screen-printed onto a polyimide film substrate having a thickness of 1.4 mm and then hardened by heating at 200° C. for one hour. The measurement results of the conductivity of the wiring board thus obtained revealed that the paste was useful as a conductive paste.

Examples of Preparation of Anisotropic Conductive Film

In 30 parts by mass of ethyl acetate were dissolved 40 parts by mass of a bisphenol A-based epoxy resin ("AER 6097", product of Asahi Kasei Chemicals, epoxy equivalent; 42500 g/eq) and 30 parts by mass of a phenoxy resin ("YP-50", product of Tohto Kasei) to yield a varnish serving as a raw material of an anisotropic conductive film. To the varnish thus obtained were added 30 parts by mass of the masterbatch-based hardener composition for the epoxy resin obtained in Example 16 and 5 parts by mass of conductive particles having a particle size of 8 µm (crosslinked polystyrene plated with gold), followed by uniform mixing to yield a one-part epoxy resin composition. The one-part epoxy resin composition thus obtained was applied to a polyester film and ethyl acetate was dried off at 70° C. to obtain an anisotropic conductive film.

The anisotropic conductive film thus obtained was sandwiched between an IC chip and an electrode of a test substrate and they were thermocompression bonded at 30 kg/cm² for 20 seconds on a hot plate of 200° C. The IC chip and the electrode of a test substrate were bonded to each other and electric continuity between them was confirmed. The anisotropic conductive film was therefore useful as an anisotropic conductive material.

Example of Preparation of Anisotropic Conductive Paste

An anisotropic conductive paste was obtained by mixing 50 parts by mass of a bisphenol A-based epoxy resin ("AER 6091", product of Asahi Kasei Chemicals, epoxy equivalent: 480 g/eq), 50 parts by mass of a bisphenol A-based epoxy resin ("AER 2603", product of Asahi Kasei Chemicals), and 5 parts by mass of conductive particles "Micropearl Au-205" (product of Sekisui Chemical, specific gravity: 2.67); adding 30 parts by mass of the masterbatch-based hardener composition for the epoxy resin obtained in Example 16; and mixing the resulting mixture uniformly. The anisotropic conductive paste thus obtained was applied to a low alkali glass having indium tin oxide (ITO) electrodes. It was contact bonded to and laminated with a test TAB (Tape Automated Bonding) film at a pressure of 2 MPa for 30 seconds by using a ceramic tool of 230° C. Measurement of the resistance between the two adjacent ITO electrodes revealed that the paste was useful as an anisotropic conductive paste.

Example of Preparation of Insulating Paste

An insulating paste was prepared by sufficiently mixing 100 parts by mass of a bisphenol F-based epoxy resin ("YL983U", trade name; product of Yuka-Shell Epoxy), 4 parts by mass of dicyandiamide, 100 parts by mass of silica powder, 10 parts by mass of phenyl glycidyl ether as a diluent, and 1 part by mass of an organic phosphate ("PM-2", trade name; product of Nippon Kayaku); kneading the resulting mixture further in a triple roll mill; adding, to the resulting mixture, 30 parts by mass of the masterbatch-based hardener composition for the epoxy resin obtained in Example 16; uniformly mixing the resulting mixture; and carrying out vacuum deaeration and centrifugal deaeration. With the resulting insulating paste, a semiconductor chip was hardened and bonded to a resin substrate by heating at 200° C. for one hour. As a result, it was found that the paste was useful as an insulating paste.

Example of Preparation of Insulating Film

A solution containing an epoxy resin composition was prepared by blending 180 parts by mass of a phenoxy resin ("YP-50", trade name; product of Tohto Kasei), 40 parts by mass of a cresol novolac-based epoxy resin ("EOCN-1020-80", trade name; product of Nippon Kayaku, epoxy equivalent weight: 200 g/eq), 300 parts by mass of spherical silica ("SE-5101", trade name; product of Admatec, average particle size: 2 µm), and 200 parts by mass of methyl ethyl ketone; uniformly dispersing the resulting mixture; adding 250 parts by mass of the masterbatch-based hardener composition for the epoxy resin obtained in Example 16; and stirring and mixing the resulting mixture further. The resulting solution was applied to polyethylene terephthalate subjected to release treatment to give a dry film thickness of 50 µm, followed by thermal drying in a circulating hot air drier to obtain an insulating film for bonding semiconductors. The resulting insulating film for bonding semiconductors was cut together with a supporting substrate thereof to a size larger than that of a 5-inch wafer, and the resin film was put together with the electrode side of a wafer having a bump electrode.

The insulating film was then sandwiched with the wafer having a bump electrode by using a thermocompression bonder with the side of the supporting substrate subjected to release treatment up; and was then thermocompression bonded in vacuum at 70° C. and 1 MPa for a pressing time of 10 seconds to obtain a wafer with the adhesive resin. The wafer with the adhesive resin was then cut with a dicing saw ("DAD-2H6M", product of DISCO) at a spindle revolution of 30,000 rpm and a cutting speed of 20 mm/sec. As a result of observation whether the cut and separated pieces of the semiconductor device with the adhesive film had resin peeling or not, the film thus obtained was useful as an insulating film.

Examples of Preparation of Sealing Material

An epoxy resin composition was obtained by uniformly dispersing and mixing 50 parts by mass of a bisphenol A-based epoxy resin ("AER 6091", product of Asahi Kasei Chemicals, epoxy equivalent: 480 g/eq), 50 parts by mass of a bisphenol A-based epoxy resin ("AER 2603", product of Asahi Kasei Chemicals), 40 parts by mass of "HN-2200" (product of Hitachi Chemical) composed mainly of phthalic anhydride as a hardener, and 80 parts by mass of spherical fused silica having an average particle size of 16 μm; and then adding 5 parts by mass of the masterbatch-based hardener composition for the epoxy resin obtained in Example 16. The resulting epoxy resin composition was applied to a 1 cm square of a printed wiring board to give a thickness of 60 μm and half-cured by heating in an oven at 110° C. for 10 minutes. A silicon chip having 1 cm square and a thickness of 370 μm was placed on the half-cured epoxy resin composition and completely hardened at 220° C. for one hour while applying a load and keeping contact between the bump and the electrode of the chip. The resulting sealing material composed of the epoxy resin composition was found to be useful without any problem in appearance and continuity of the chip.

Example of Preparation of Coating Material

To a mixture of 30 parts by mass of the epoxy resin (e4), 30 parts by mass of "YP-50" (product of Tohto Kasei) as a phenoxy resin, and 50 parts by mass of a methyl ethyl ketone solution of a methoxy-containing silane modified epoxy resin ("Compoceran E103", trade name; product of Arakawa Chemical Industries) was added 30 parts by mass of the masterbatch-based hardener composition for the epoxy resin obtained in Example 16. Thus, a mixed solution diluted with methyl ethyl ketone to 50% by mass was prepared. The solution thus obtained was applied to a PET (polyethylene terephthalate) release film ("SG-1", product of Panac) with a roll coater and dried and hardened at 150° C. for 15 minutes to prepare a half-hardened resin film (dry film) with a release film having a thickness of 100 μm. The dry film was thermocompression bonded to a copper-clad laminate at 120° C. for 10 minutes at 6 MPa. After the temperature was returned to room temperature, the release film was removed, followed by curing at 200° C. for 2 hours. The coating material thus obtained was useful as a coating material for interlayer insulation.

Example of Preparation of Paint Composition

A paint composition useful as an epoxy paint composition was prepared by mixing, with 50 parts by mass of a bisphenol A-based epoxy resin ("AER 6091", product of Asahi Kasei Chemicals, epoxy equivalent: 480 g/eq), 30 parts by weight of titanium dioxide and 70 parts by weight of talc; adding a 1:1 MIBK/xylene solvent mixture; stirring and mixing the resulting mixture to obtain a main base resin; adding 30 parts by mass of the masterbatch-based hardener composition for the epoxy resin obtained in Example 16 to the main base resin; and uniformly dispersing the resulting mixture.

Example of Preparation of Prepreg

In a flask placed in an oil bath of 130° C., 15 parts by mass of a novolac-based epoxy resin ("EPICLON N-740", product of DIC), 40 parts by mass of a bisphenol F-based epoxy resin ("Epikote 4005", product of Japan Epoxy Resins), and 30 parts by mass of a bisphenol A-based liquid epoxy resin ("AER 2603", product of Asahi Kasei Chemicals) were dissolved and mixed. The resulting mixture was then cooled to 80° C. To the reaction mixture was added 15 parts by mass of the masterbatch-based hardener composition for the epoxy resin obtained in Example 16, followed by mixing sufficiently by stirring. The resin composition cooled to room temperature was then applied onto release paper with a doctor knife to give a resin weight of 162 g/m² to form a resin film. The resin film was overlaid with a carbon fiber (CF) cloth (model: TR 3110, weight: 200 g/m²) manufactured by Mitsubishi Rayon in which carbon fibers having a modulus of elasticity of 24 tons/mm² were plain-woven at a weaving density of 12.5 threads/inch and the resin composition was impregnated in the carbon fiber cloth. The impregnated carbon fiber cloth was overlaid with a polypropylene film and they were passed through a pair of rolls having a surface temperature of 90° C. to prepare a cloth prepreg. The cloth prepreg had a resin content of 45% by mass. The prepregs thus obtained were stacked further while arranging the fiber direction and the stack was hardened at 150° C. for one hour to obtain a fiber reinforced resin (Fiber Reinforced Plastics, which will hereinafter be abbreviated as "FRP") having carbon fibers as reinforcing fibers. The prepreg thus obtained was found to be useful.

Example of Preparation of Thermal Conductive Epoxy Resin Composition

After stirring 100 parts by mass of a bisphenol A-based epoxy resin ("AER 2603", product of Asahi Kasei Chemicals), 40 parts by mass of a 50% methyl ethyl ketone solution of a phenolic novolac resin ("Tamanol 759", trade name; product of Arakawa Chemical Industries) as a hardener for the epoxy resins, and 15 parts by mass of flake graphite powder ("HOPG", trade name; product of Union Carbide) until the mixture became uniform, the resulting mixture was uniformly dispersed in a triple roll mill. To the resulting uniform dispersion was added 15 parts by mass of the masterbatch-based hardener composition for the epoxy resin obtained in Example 16, followed by sufficient mixing by stirring. With the conductive paste thus obtained, a semiconductor chip (1.5 mm square, 0.8 mm thick) was mounted on a Cu lead frame, followed by heating and hardening at 150° C. for 30 minutes to obtain an evaluation sample. The sample was evaluated for the thermal conductivity by a laser flash method. Described specifically, the thermal conductivity K was determined from the measured thermal diffusivity $\alpha$, specific heat $C_p$, and density $\sigma$ in accordance with the equation $K = \alpha \times C_p \times \sigma$. The thermal conductivity K was $5 \times 10^{-3}$ Cal/cm·sec·° C. or greater, suggesting that the sample was useful as a thermal conductive paste.

Example of Preparation of Sealing Material for Fuel Cell

As raw materials, 100 parts by mass of a biphenyl-based resin 3,3',5,5'-tetraethyl-4,4'-dihydroxybiphenyl glycidyl ether ("Epikote YX-4000", product of Japan Epoxy Resins, epoxy equivalent: 195), 60 parts by mass of a phenolic novolac resin ("TD-2131", product of DIC), 10 parts by mass of a bisphenol A type epoxy resin ("AER 2603", product of Asahi Kasei Chemicals), 800 parts by mass of artificial graphite ("SGP", trade name; product of SEC Carbon, average particle size: 75 μm), a release agent (calcium stearate) and a lubricant (carnauba wax) were mixed in a mixer. To the resulting mixture was added 10 parts by mass of the masterbatch-based hardener composition for the epoxy resin obtained in Example 16, followed by uniform mixing in a triple roll mill. The material thus obtained was pressure molded in a mold for separator material for fuel cell at a molding pressure of 25 MPa, at a molding temperature of 150° C. for a molding time of 15 minutes to yield an evaluation sample. As a result of measuring the bending strength of the resulting separator material for fuel cell in accordance with JIS K 7203, it showed a bending strength of 50 MPa. The gas permeability of the material was measured using a nitrogen gas in accordance with JIS K7126. It had a gas permeability of 0.6 cm$^3$/m$^2$·24 hours·atom. These results suggest that the material was useful as a separator material for fuel cell.

Example of Preparation of an Overcoat Material for Flexible Wiring Board

Fifty parts by mass of a resin "EPB-13" (epoxy equivalent: 700 g/eq., viscosity: 800P) obtained by epoxy-resin modification as a result of a reaction between a polybutadiene dicarboxylic acid resin "C-1000" (product of Nippon Soda) and a bisphenolic epoxy resin, 70 parts by mass of a maleinated polybutadiene resin "BN-1015" (product of Nippon Soda, acid equivalent: 145 g/eq) as a resin reactive with an epoxy group, 5 parts by mass of the masterbatch-based hardener composition for the epoxy resin obtained in Example 16 as a curing accelerator, and 3 parts by mass of "EXR-91" (product of JSR) as fine rubber particles were mixed uniformly in a triple roll mill. To the resulting uniform mixture was added 200 parts by mass of methyl ethyl ketone (MEK) and the resulting mixture was dissolved and dispersed by stirring and mixing in a mixer until the resulting mixture became uniform to yield an overcoat adhesive solution. The resulting adhesive solution was applied to a polyimide film of 35 mm wide, 60 mm long, and 65 μm thick to give a dry film thickness of 25 μm, followed by drying at 150° C. for 20 minutes to yield an overcoat material sample for flexible wiring board. The presence or absence of cracks when the polyimide film was bent by 180° C. and warpage of the polyimide film when treated at a humidity of 50% and a temperature of 150° C. for 8 hours were analyzed. The results suggest that the film was useful as an overcoat material for flexible wiring board.

The invention claimed is:

1. A microcapsule-based hardener for an epoxy resin comprising: a core (C) formed using a hardener (H) for the epoxy resin as a starting material and; a shell (S) covering the core (C) therewith, wherein:
   the hardener (H) for the epoxy resin has an amine adduct (A) as a main component and the amine adduct (A) is available by a reaction between an epoxy resin (e1) and an amine compound;
   the hardener (H) for the epoxy resin has an average particle size exceeding 0.3 μm and not greater than 12 μm and contains 0.1 to 15% of small-particle-size hardener components, which are components having a particle size 0.5 times or less of the average particle size of the hardener (H) for the epoxy resin; and
   the shell (S) has, at least on the surface thereof, a binding group (x) capable of absorbing an infrared ray having a wave number of from 1630 to 1680 cm$^{-1}$, a binding group (y) capable of absorbing an infrared ray having a wave number of from 1680 to 1725 cm$^{-1}$, and a binding group (z) capable of absorbing an infrared ray having a wave number of from 1730 to 1755 cm$^{-1}$.

2. A microcapsule-based hardener for an epoxy resin comprising: a core (C) formed using a hardener (H) for the epoxy resin as a starting material and; a shell (S) covering the core (C) therewith, wherein:
   the hardener (H) for the epoxy resin has an amine adduct (A) as a main component and the amine adduct (A) is available by a reaction between an epoxy resin (e1) and an amine compound;
   the hardener (H) for the epoxy resin has an average particle size exceeding 0.3 μm and not greater than 12 μm and the hardener (H) for the epoxy resin has a specific surface area of from 1 to 25 m$^2$/g; and
   the shell (S) has, at least on the surface thereof, a binding group (x) capable of absorbing an infrared ray having a wave number of from 1630 to 1680 cm$^{-1}$, a binding group (y) capable of absorbing an infrared ray having a wave number of from 1680 to 1725 cm$^{-1}$, and a binding group (z) capable of absorbing an infrared ray having a wave number of from 1730 to 1755 cm$^{-1}$.

3. The microcapsule-based hardener for the epoxy resin according to claim 1, wherein the shell (S) has, in a structure thereof, a urea bond but has no ester bond.

4. The microcapsule-based hardener for an epoxy resin according to claim 1 or 2, comprising: a core (C) formed using a hardener (H) for the epoxy resin as a starting material and; a shell (S) covering the core (C) therewith, wherein:
   the hardener (H) for the epoxy resin has an amine adduct (A) as a main component and the amine adduct (A) is available by a reaction between an epoxy resin (e1) and an amine compound;
   the hardener (H) for the epoxy resin has an average particle size exceeding 0.3 μm and not greater than 10 μm; and
   the shell (S) has, in a structure thereof, a urea bond but has no ester bond, and a ratio of a thickness of the shell (S) to the average particle size of the hardener (H) for the epoxy resin falls within a range of from 100:1.5 to 100:18.

5. The microcapsule-based hardener for the epoxy resin according to claim 1, wherein the shell (S) has, in the structure thereof, a urea bond but has no carboxylate bond.

6. . The microcapsule-based hardener for the epoxy resin according to claim 1, wherein the hardener (H) for the epoxy resin further comprises a low molecular amine compound (B).

7. The microcapsule-based hardener for the epoxy resin according to claim 6, wherein the low molecular amine compound (B) is an imidazole.

8. The microcapsule-based hardener for the epoxy resin according to claim 1, wherein the hardener (H) for the epoxy resin is a solid at 25° C.

9. The microcapsule-based hardener for the epoxy resin according to claim 1, wherein the shell (S) comprises a reaction product available using, as a raw material, at least two compounds selected from the group consisting of isocyanate compounds, active hydrogen compounds, hardeners (h2) for an epoxy resin, epoxy resins (e2), and the low molecular amine compounds (B).

10. The microcapsule-based hardener for the epoxy resin according to claim 1, wherein a total chlorine content in the hardener (H) for the epoxy resin, the epoxy resin (e1), or the epoxy resin (e2) is 2500 ppm or less.

11. A masterbatch-based hardener composition for an epoxy resin comprising: the microcapsule-based hardener for the epoxy resin as claimed in claim 1 and; an epoxy resin (e3) at a (the microcapsule-based hardener for the epoxy resin):(the epoxy resin (e3)) ratio (mass ratio) ranging from 100:0.1 to 100:1000.

12. The masterbatch-based hardener composition for the epoxy resin according to claim 11, wherein a total chlorine content in the epoxy resin (e3) is 2500 ppm or less.

13. The masterbatch-based hardener composition for the epoxy resin according to claim 11, wherein an amount of a diol-terminated component present in the epoxy resin (e3) is from 0.001 to 30% by mass of a fundamental structural component of the epoxy resin (e3).

14. A masterbatch-based hardener composition for an epoxy resin comprising: a microcapsule-based hardener for the epoxy resin according to claim 1 or 2, an epoxy resin (e3), and a highly-soluble epoxy resin (G), the microcapsule-based hardener for the epoxy resin being dispersed and mixed in the epoxy resin (e3) and/or the highly soluble epoxy resin (G), wherein:
the microcapsule-based hardener (H) for the epoxy resin has a core (C) formed using a hardener (H) for the epoxy resin as a starting material and a shell (S) covering the core (C) therewith, the hardener (H) for the epoxy resin has an amine adduct (A) and a low molecular amine compound as a main component, the amine adduct (A) is available by a reaction between an epoxy resin (e1) and an amine compound, and the hardener (H) for the epoxy resin has an average particle size exceeding 0.3 μm and not greater than 12 μm;
the highly soluble epoxy resin (G) has a fundamental structure in which a solubility parameter is from 8.65 to 11.00 and an inter-crosslink molecular weight after hardening of the fundamental structure is from 105 to 150, and has a diol-terminated component in an amount of from 0.01 to 20% by mass based on the fundamental structural component;
the microcapsule-based hardener for the epoxy resin and the epoxy resin (e3) are contained at a (the microcapsule-based hardener for the epoxy resin):(the epoxy resin (e3)) ratio (mass ratio) of from 100:0.1 to 100:1000;
the epoxy resin (e3) and the highly soluble epoxy resin (G) are contained at an (the epoxy resin (e3)):(the highly soluble epoxy resin (G)) ratio (mass ratio) of from 100:0.1 to 100:99; and
a total chlorine content is 2500 ppm or less.

15. The masterbatch-based hardener composition for the epoxy resin according to claim 11, further comprising at least one hardener (h3) for the epoxy resin selected from the group consisting of acid anhydrides, phenols, hydrazides, and guanidines, or a cyclic borate ester compound.

16. The masterbatch-based hardener composition for the epoxy resin according to claim 15, wherein the cyclic borate ester compound is 2,2'-oxybis(5,5'-dimethyl-1,3,2-dioxaborinane).

17. The masterbatch-based hardener composition for the epoxy resin according to claim 15, wherein a content of the cyclic borate ester compound is from 0.001 to 10% by mass.

18. A one-part epoxy resin composition comprising: the masterbatch-based hardener composition for the epoxy resin as claimed in claim 11 and; an epoxy resin (e4) at a (the masterbatch-based hardener composition for the epoxy resin):(the epoxy resin (e4)) ratio (mass ratio) of from 100:0.001 to 100:1000.

19. The one-part epoxy resin composition according to claim 18, further comprising at least one hardener (h3) for the epoxy resin selected from the group consisting of acid anhydrides, phenols, hydrazides, and guanidines, or a cyclic borate ester compound.

20. The one-part epoxy resin composition according to claim 19, wherein the cyclic borate ester compound is 2,2'-oxybis(5,5'-dimethyl-1,3,2-dioxaborinane).

21. The one-part epoxy resin composition according to claim 19, wherein a content of the cyclic borate ester compound is from 0.001 to 10% by mass.

22. A processed good obtained using the masterbatch-based hardener composition for the epoxy resin as claimed in claim 11.

23. The processed good according to claim 22, which is selected from the group consisting of paste-like compositions, film-like compositions, adhesives, bonding pastes, bonding films, conductive materials, anisotropic conductive materials, anisotropic conductive films, insulating materials, sealing materials, coating materials, paint compositions, prepregs, heat conductive materials, separator materials for fuel cell, and overcoat materials for flexible wiring substrate.

24. The microcapsule-based hardener for the epoxy resin according to claim 2, wherein the shell (S) has, in a structure thereof, a urea bond but has no ester bond.

25. The microcapsule-based hardener for the epoxy resin according to claim 4, wherein the shell (S) has, in the structure thereof, a urea bond but has no carboxylate bond.

26. The microcapsule-based hardener for the epoxy resin according to claim 25, wherein the hardener (H) for the epoxy resin further comprises a low molecular amine compound (B).

27. The microcapsule-based hardener for the epoxy resin according to claim 26, wherein the low molecular amine compound (B) is an imidazole.

28. The microcapsule-based hardener for the epoxy resin according to claim 27, wherein the hardener (H) for the epoxy resin is a solid at 25° C.

29. The microcapsule-based hardener for the epoxy resin according to claim 28, wherein the shell (S) comprises a reaction product available using, as a raw material, at least two compounds selected from the group consisting of isocyanate compounds, active hydrogen compounds, hardeners (h2) for an epoxy resin, epoxy resins (e2), and the low molecular amine compounds (B).

30. The microcapsule-based hardener for the epoxy resin according to claim 29, wherein a total chlorine content in the hardener (H) for the epoxy resin, the epoxy resin (E1), or the epoxy resin (e2) is 2500 ppm or less.

31. A masterbatch-based hardener composition for an epoxy resin comprising: the microcapsule-based hardener for the epoxy resin as claimed in claim 30 and; an epoxy resin (e3) at a (the microcapsule-based hardener for the epoxy resin):
(the epoxy resin (e3)) ratio (mass ratio) ranging from 100:0.1 to 100:1000.

32. The masterbatch-based hardener composition for the epoxy resin according to claim 31, wherein a total chlorine content in the epoxy resin (e3) is 2500 ppm or less.

33. The masterbatch-based hardener composition for the epoxy resin according to claim 32, wherein an amount of a diol-terminated component present in the epoxy resin (e3) is from 0.001 to 30% by mass of a fundamental structural component of the epoxy resin (e3).

34. The masterbatch-based hardener composition for the epoxy resin according to claim 14, further comprising at least one hardener (h3) for the epoxy resin selected from the group consisting of acid anhydrides, phenols, hydrazides, and guanidines, or a cyclic borate ester compound.

35. The masterbatch-based hardener composition for the epoxy resin according to claim 34, wherein the cyclic borate ester compound is 2,2'- oxybis (5,5'-dimethyl-1,3,2-dioxaborinane).

36. The masterbatch-based hardener composition for the epoxy resin according to claim 35, wherein a content of the cyclic borate ester compound is from 0.001 to 10% by mass.

37. A one-part epoxy resin composition comprising: the masterbatch-based hardener composition for the epoxy resin as claimed in claim 36 and; an epoxy resin (e4) at a (the masterbatch-based hardener composition for the epoxy resin):(the epoxy resin (e4)) ratio (mass ratio) of from 100:0.001 to 100:1000.

38. The one-part epoxy resin composition according to claim 37, further comprising at least one hardener (h3) for the epoxy resin selected from the group consisting of acid anhydrides, phenols, hydrazides, and guanidines, or a cyclic borate ester compound.

39. The one-part epoxy resin composition according to claim 38, wherein the cyclic borate ester compound is 2,2'-oxybis(5,5'-dimethyl-1,3,2-dioxaborinane).

40. The one-part epoxy resin composition according to claim 39, wherein a content of the cyclic borate ester compound is from 0.001 to 10% by mass.

41. A processed good obtained using the masterbatch-based hardener composition for the one part epoxy resin composition as claimed in claim 40.

42. The processed good according to claim 41, which is selected from the group consisting of paste-like compositions, film-like compositions, adhesives, bonding pastes, bonding films, conductive materials, anisotropic conductive materials, anisotropic conductive films, insulating materials, sealing materials, coating materials, paint compositions, prepregs, heat conductive materials, separator materials for fuel cell, and overcoat materials for flexible wiring substrate.

43. The microcapsule-based hardener for an epoxy resin according to claim 1 or 2, wherein the amine adduct (A) is obtained by a reaction between an epoxy resin (e1) and from 0.5 to 10 equivalents, in terms of moles of the amine compound itself based on the moles of the epoxy group of the epoxy resin (e1), of an amine compound.

44. A microcapsule-based hardener for an epoxy resin according to claim 1 or 2, wherein the hardener (H) for the epoxy resin comprises a low molecular amine compound (B) in an amount of from 0.001 to 3% by mass based on the total amount of the amine adduct (A) and the low molecular amine compound (B).

45. A microcapsule-based hardener for an epoxy resin according to claim 1 or 2, wherein the hardener (H) for the epoxy resin is obtained by grinding hardener (h) for the epoxy resin in the massive form followed by classification.

* * * * *